(12) United States Patent
Sasai et al.

(10) Patent No.: US 8,208,549 B2
(45) Date of Patent: Jun. 26, 2012

(54) DECODER, ENCODER, DECODING METHOD AND ENCODING METHOD

(75) Inventors: Hisao Sasai, Osaka (JP); Satoshi Kondo, Kyoto (JP); Thomas Wedi, Gross-Umstadt (DE); Steffen Wittmann, Morfelden-Walldorf (DE); Martin Schlockermann, Roedermark (DE)

(73) Assignee: Panasonic Corporation, Osaka (JP)

( * ) Notice: Subject to any disclaimer, the term of this patent is extended or adjusted under 35 U.S.C. 154(b) by 1521 days.

(21) Appl. No.: 11/661,277

(22) PCT Filed: Aug. 29, 2005

(86) PCT No.: PCT/JP2005/015679
§ 371 (c)(1),
(2), (4) Date: Feb. 27, 2007

(87) PCT Pub. No.: WO2006/025339
PCT Pub. Date: Mar. 9, 2006

(65) Prior Publication Data
US 2008/0117975 A1 May 22, 2008

(30) Foreign Application Priority Data
Aug. 30, 2004 (EP) .................................. 04020569

(51) Int. Cl.
*H04N 7/12* (2006.01)
(52) U.S. Cl. .................. 375/240.16; 382/239; 382/240
(58) Field of Classification Search ............. 375/240.16; 382/239–240
See application file for complete search history.

(56) References Cited

U.S. PATENT DOCUMENTS

| | | | |
|---|---|---|---|
| 4,802,005 A | 1/1989 | Kondo | |
| 5,508,747 A | 4/1996 | Lee | |
| 6,192,079 B1 * | 2/2001 | Sharma et al. | 375/240.16 |
| 6,349,154 B1 | 2/2002 | Kleihorst | |
| 6,510,177 B1 | 1/2003 | De Bonet et al. | |
| 7,158,570 B2 * | 1/2007 | Nagumo et al. | 375/240.16 |
| 2004/0131122 A1 * | 7/2004 | Kudo | 375/240.16 |
| 2004/0252901 A1 * | 12/2004 | Klein Gunnewiek et al. | 382/240 |

(Continued)

FOREIGN PATENT DOCUMENTS

EP   0 255 289   2/1988

(Continued)

OTHER PUBLICATIONS

A Simd Dsp for Real-time Mpeg Video Encoding and Decodiing Tamitani, I.; Yoshida, A.; Ooi, Y.; Nishitani, T. VLSI Signal Processing, V, 1992., [Workshop on] (0-7803-0811-5) 1992. p. 119-128.*

(Continued)

*Primary Examiner* — Taghi Arani
*Assistant Examiner* — Angela Holmes
(74) *Attorney, Agent, or Firm* — Wenderoth, Lind & Ponack, L.L.P.

(57) ABSTRACT

A decoder according to the present invention includes: an obtainment unit which obtains additional information that includes a motion vector indicating a motion of an image in the first video data, and stream data that is coded data of the second video data which has the same content as the first video data and which has the lower resolution than the resolution of the first video data; a decoding unit which decodes the stream data into images of the second video data; and a conversion unit which converts the decoded images of the second video data into third video data having the same resolution as the first video data, through interpolation using the additional information.

15 Claims, 22 Drawing Sheets

U.S. PATENT DOCUMENTS

2006/0133475 A1    6/2006    Bruls et al.

FOREIGN PATENT DOCUMENTS

| EP | 0 637 889 | 2/1995 |
|---|---|---|
| JP | 63-35093 | 2/1988 |
| JP | 6-209468 | 7/1994 |
| JP | 10-126749 | 5/1998 |
| JP | 2000-36963 | 2/2000 |
| JP | 2003-134476 | 5/2003 |
| WO | 99/52281 | 10/1999 |
| WO | 2004/073312 | 8/2004 |

OTHER PUBLICATIONS

Algorithms & implementation of advanced video coding standards by Li, Jianjun, Ph.D., University of Windsor (Canada), 2010, 141 pages; AAT NR62760.*

Scalable and ultra-high resolution MPEG video delivery on tiled displays by Chen, Han, Ph.D., Princeton University, 2003, 175 pages; AAT 3107868.*

3-D Model-Based Frame Interpolation for Distributed Video Coding of Static Scenes ;Date of Publication: May 2007 Author(s): Maitre, M. Beckman Inst., Illinois Univ., Urbana, IL Guillemot, C. ; Morin, L.*

"De-Interlacing of Video Data", IEEE Trans. on CE, vol. 43, No. 3, Aug. 1997, pp. 819-825.

Taiichiro Kurita and Yukio Sugiura, entitled "Consideration of a Motion-Compensated Deinterlacing Method", Shingakuron (D-II), vol. J78-D-II, No. 1, pp. 40-49, Jan. 1995.

Supplementary European Search Report (in English language) issued May 29, 2009 in corresponding European Patent Application No. 05775151.

Partial English translation of JP 2003-134476, filed Feb. 27, 2007.

* cited by examiner

DECODER, ENCODER, DECODING METHOD AND ENCODING METHOD

TECHNICAL FIELD

The present invention relates to an encoder and a decoder that convert video data resolution.

BACKGROUND ART

Patent Document 1 discloses, for a decoder with a resolution conversion function, a technique for transforming interlaced images into progressive images. According to the conventional technique, the progressive images are generated using motion vectors included in a coded bit stream of the interlaced images.

According to Non-Patent Document 1, pixels of a progressive image are estimated from an interlaced image using a filter or the like, and high resolution for an image area with pixels similar to the estimated pixels can be realized.

Patent Document 2 discloses a technique used in a scalable coding of coding a base moving image which is to become a base, and an expanded moving image resulting from the expansion of the base moving image. The technique is coding the pixel values of a base moving image as well as coding a difference in pixel values between an expanded moving image and the base moving image.

Patent Document 1: Japanese Laid-Open Patent Application No. 10-126749

Non-Patent Document 1: "Consideration Of A Motion-Compensated Deinterlacing Method" (Taiichiro KURITA, Yukio SUGIURA, Shingakuron (D-II), vol. J78-D-II, No. 1, pp. 40-49, January 1995)

Patent Document 2: International Publication No. 2004/73312 A1

SUMMARY OF THE INVENTION

Problems that Invention is to Solve

However, according to Non-Patent Document 1, an inappropriate motion vector may be used in the case where the accuracy of the filter for estimating high-resolution is low, which causes a problem that the accuracy of the high-resolution image is low.

According to Patent Document 1, there is a case where motion vectors are incorrect because the motion vectors included in a bit stream are not necessarily the same as the motions of the images, which causes a problem that the accuracy of the high-resolution image is low.

Moreover, according to Non-Patent Document 1, as motion vectors are estimated by a decoder, these motion vectors can realize a motion more similar to the motion of the image than the motion vectors included in a bit stream can. This, however, causes a problem that the processing load of the decoder drastically increases.

Patent Document 2 mentions the problem that coding not only the pixel values of a base moving picture but also the difference pixel values of an extended moving picture renders it difficult to reduce the bit rate.

Means to Solve the Problems

An object of the present invention is to provide a decoder and an encoder that generate high-resolution images from low-resolution images with low bit rate, low processing amount, and high image quality.

In order to achieve the above-mentioned object, an image encoder of the present invention includes an obtainment unit which obtains additional information and stream data, the additional information including a motion vector which indicates a motion of an image of first video data, and the stream data being coded data of second video data which has the same content as the first video data and which has a resolution lower than the resolution of the first video data; a decoding unit which decodes the stream data into an image of the second video data; and a conversion unit which converts the image of the second video data into an image of third video data by interpolating the image of the second video data using the additional information, the image of the second video data being obtained by the decoding, and the third video data having the same resolution as the resolution of the first video data.

With the configuration as described above, the decoder does not need to estimate the motion of an image for the generation of a high-resolution image because additional information which indicates a motion of an image can be obtained together with stream data. Also, there being no need to estimate real-time the motion during the decoding process, it is possible to reduce the processing amount required for achieving high-resolution. In addition, the bit rate can be reduced since the additional information does not include codes indicating the pixel values of the first video data.

The conversion unit may include: an extraction unit which extracts the motion vectors from the additional information; and an interpolation unit which interpolates the pixels in the images of the second video data using the extracted motion vectors.

With such a configuration, it is possible to reduce the amount of processing since high-resolution images can be obtained by interpolating the pixels in the images of the second video data according to the motion vectors.

The conversion unit may include: an extraction unit which extracts the motion vector from the additional information; a first interpolation unit which interpolates pixels in the image of the second video data using pixels in the image, the image of the second video data being obtained by the decoding by the decoding unit; a second interpolation unit which interpolates pixels in the image of the second video data, using the extracted motion vector, the image of the second video data being obtained by the decoding by the decoding unit; and a generation unit which generates the image of the third video data by selectively using the first interpolation unit and the second interpolation unit.

With the configuration as described above, by selectively using the interpolation performed within an image by the first interpolation unit and the interpolation performed between images by the second interpolation unit, it is possible to effectively generate images of the third video data.

The second interpolation unit may include: a memory unit which holds a converted image of the third video data and an image to be converted of the third video data; a first specification unit which specifies a position of each pixel to be interpolated in the image to be converted of the third video data; a second identification unit which identifies a pixel in the converted image of the third video data according to the motion vector, the pixel being located in the position specified by the first specification unit; a reading unit which reads a value of the pixel identified by the second identification unit; and a writing unit which writes a value of the interpolated pixel in the position specified by the first specification unit, according to the value read by the reading unit.

With the configuration as described above, the pixel to be interpolated in an image of the third video data to which conversion is to be performed can be obtained from a converted image of the third video data according to a motion vector. It is therefore possible to effectively perform interpolation between the images with less amount of processing.

The additional information may include a motion vector per block which constitutes the first video data, the first specification unit may specify the position of the pixel to be interpolated in a block, and the second identification unit may identify a pixel located in the position specified by the first specification unit, according to the motion vector per block.

With this configuration, it is possible to perform interpolation between images, by which the pixel to be interpolated in a block of the third video data to which conversion is to be performed is obtained from a converted image of the third video data according to the motion vector.

The additional information may include two motion vectors for each block which constitutes the first video data, the second identification unit may identify, in two converted images of the third video data, two pixels according to the two motion vectors, the two pixels being located in the positions specified by the first specification unit, the reading unit may read values of the two pixels identified by the second identification unit, and the writing unit may calculate a value of an interpolated pixel based on the values of the two pixels read by the reading unit.

With such a configuration, interpolation between images is performed using converted two images of the third video data. It is therefore possible to render the quality of the third video data higher.

The generation unit may: generate the image of the third video data by interpolating the image of the second video data using the first interpolation unit in the case where the image of the second video data is intra-coded, and generate the image of the third video data by interpolating the image of the second video data using the second interpolation unit in the case where the image of the second video data is inter-frame prediction coded.

With the configuration as described above, an interpolation method for generating the third video data is determined in association with an encoding method for the images of the second video data. Therefore, the additional information may not necessarily include the information indicating the interpolation method, and such a configuration is suitable for the reduction of bit rate.

An encoding method according to the present invention includes: a conversion unit which converts first video data into second video data having a resolution lower than the resolution of the first video data; a coding unit which codes the second video data into stream data; a generation unit which generates additional information which indicates a motion of the first video data and is used for interpolating pixels in an image of the second video data; and an output unit which outputs the stream data and the additional information without outputting codes which indicate pixel values of the first video data.

With the configuration as described above, the additional information indicating a motion of an image is extracted from the high-resolution first video data, not the low-resolution second video data. It is therefore possible for the decoder to generate high-resolution images with high quality.

The decoding method, the encoding method and a program for realizing the methods, according to the present invention, have the same configuration as described above.

Effects of the Invention

As described above, the decoder of the present invention does not need to estimate a motion of an image for the generation of high-resolution images because additional information indicating a motion of an image can be obtained together with stream data, and it is possible to reduce the amount of processing required for the realization of high-resolution since the decoder does not need to estimate motion real-time during the decoding process. In addition, it is possible to reduce a bit rate because the additional information does not include codes which indicate the pixel values of the first video data.

NUMERICAL REFERENCES

Figure 1:
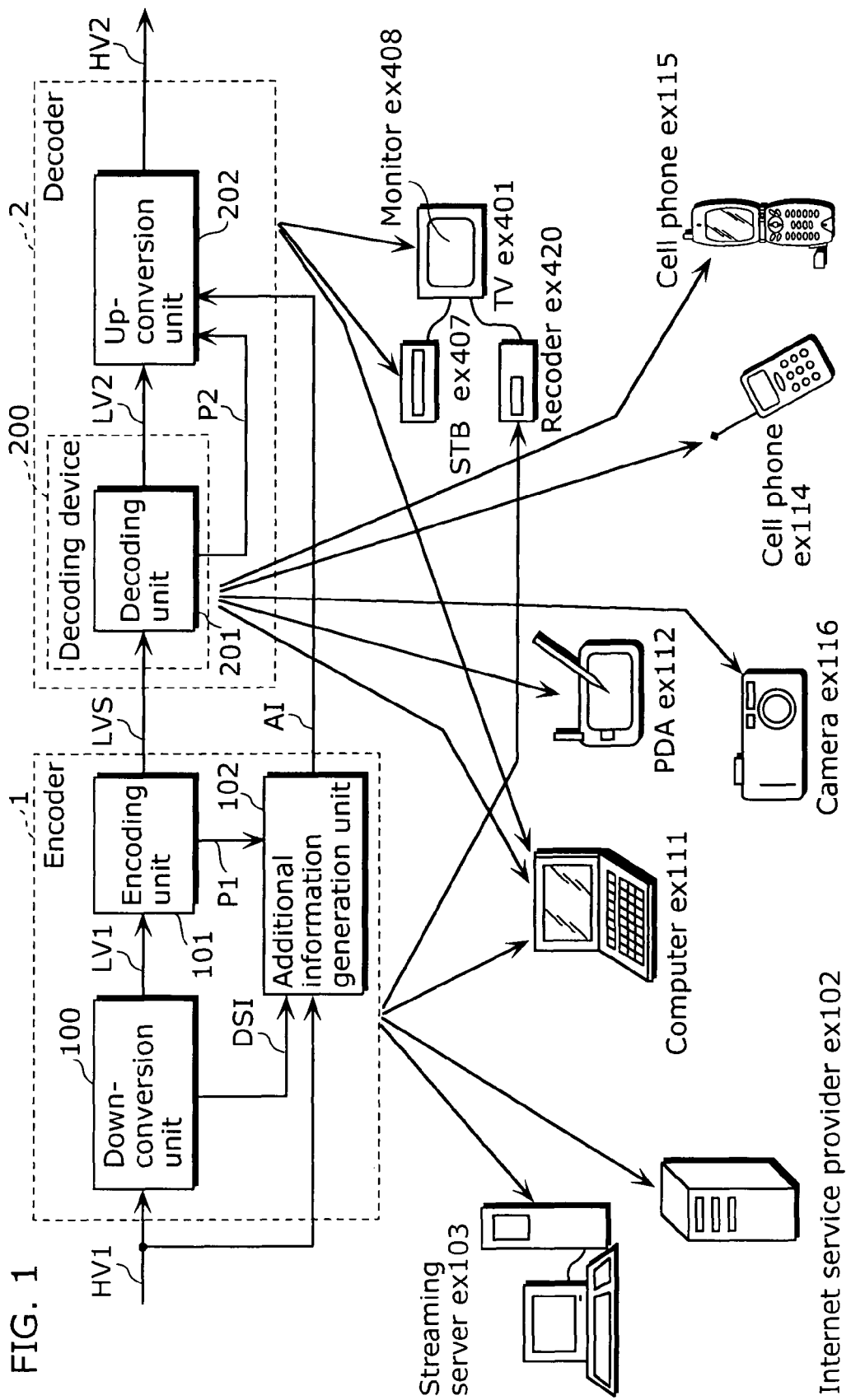
FIG. 1 is a block diagram illustrating the outline configuration of the encoder and the decoder according to the present invention.

1 Encoder
2 Decoder
100 Down-conversion unit
101 Coding unit
102 Additional information generation unit
103 Decoder
201 Decoding unit
202 Up-conversion unit
HV1 High-resolution image
LV1 Low-resolution image
LV2 Low-resolution image
HV2 High-resolution image
LVS Low-resolution image bit stream
AI Additional information
DSI Down sampling information
P1 Parameter
P2 Parameter
110 Subtractor
111 Orthogonal transformation unit
112 Quantization unit
113 Variable-length coding unit
114 Inverse quantization unit
115 Inverse orthogonal transformation unit
116 Adder
117 Predictive image generation unit
118 Motion vector estimation unit
121 High-resolution image generation unit
122 Motion vector estimation unit
123 Spatiotemporally-interpolated image generation unit
124 Generation mode selection unit
125 Variable length coding unit

DETAILED DESCRIPTION OF THE INVENTION

First Embodiment

FIG. 1 is a block diagram showing the outline configuration of the encoder and the decoder according to the first embodiment of the present invention.

The encoder 1 is configured of a down-conversion unit 100, a coding unit 101 and an additional information generation unit 102, as shown in the diagram. A concrete example of the encoder 1 is, for example, a computer ex111, an internet service provider ex102, a streaming server ex103, and the like.

The down-conversion unit 100 converts high-resolution video data HV1 to low-resolution video data LV1. The resolution of the low-resolution video data LV1 is lower than the resolution of the high-resolution video data. For example, the high-resolution video data HV1 is VGA (640×480 pixels) and the low-resolution video data LV1 is QVGA (320×240 pixels).

The coding unit 101 performs encoding on the low-resolution video data LV1. The encoding is, for example, MPEG-1, 2, 4, 4 AVC, and the like. The low-resolution video data LV1 which has been coded is outputted as low-resolution video stream LVS.

The additional information generation unit 102 generates additional information AI for realizing high resolution of the second video data. The additional information AI includes motion information indicating the motions of images in the high-resolution video data HV1, and conversion mode information for generating high-resolution video data from low-resolution video data. The conversion mode information indicates (A) a first mode indicating that a pixel should be interpolated using the pixels that are located around the pixel to be interpolated in terms of time and space, (B) a second mode indicating that the additional information includes a forward motion vector, (C) a third mode indicating that the additional information includes a backward motion vector, and (D) a fourth mode indicating that the additional information includes a plurality of motion vectors. The modes except for the first mode indicate that the resolution of the video data should be improved by obtaining a partial image from the image whose resolution has already been improved based on at least one motion vector. A conversion mode is selected per macroblock or the like, in order to realize low amount of processing and high image quality in the decoder 2.

Also, the decoder 2 is configured of a decoding device 200 and an up-conversion unit 202, as shown in FIG. 1. A concrete example of the decoding device 2 is, for example, a computer ex111, a TV ex401, an STB ex407 and the like that can display high-resolution images.

The decoder 200 includes a decoding unit 201 and decodes the low-resolution video stream LVS. The decoding unit 201 corresponds to the coding unit 101, and performs decoding by, for example, MPEG-1, 2, 4, 4 AVC, and the like. The low-resolution video stream LVS which has been decoded is outputted as low-resolution video data LV2. A concrete example of the decoding device 200 is, for example, a computer ex111, a PDA ex112, a cell phone ex114, a cell phone ex115, a digital camera ex116, a DVD recorder ex420, and the like, that have a display for low-resolution images or selectively displays low-resolution images.

The up-conversion unit 202 converts the resolution of the low-resolution video data LV2 to the resolution of the high-resolution video data HV2 based on the additional information AI.

Figure 2:
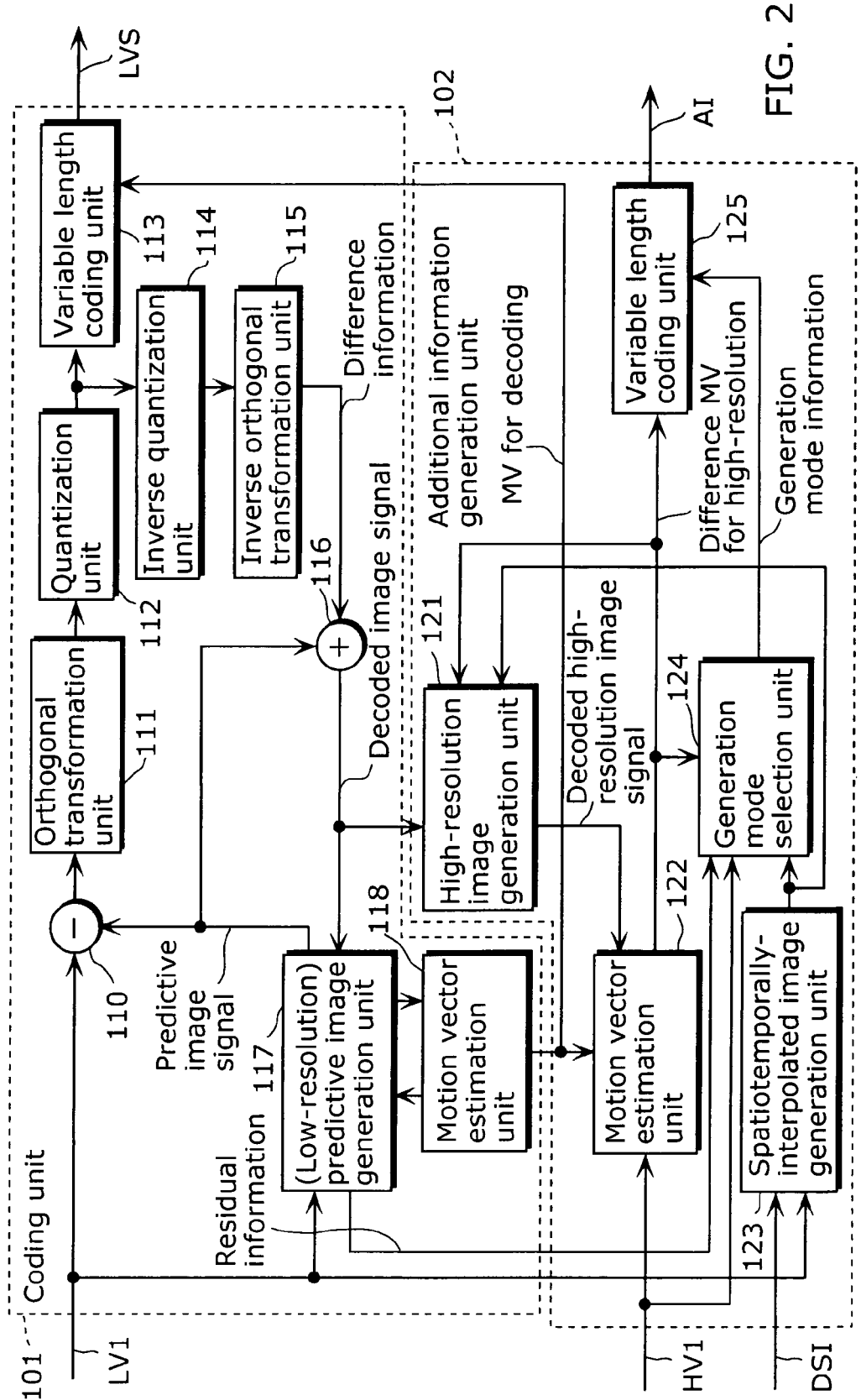
FIG. 2 is a block diagram illustrating the configurations of a coding unit 101 and an additional information generation unit 102.

FIG. 2 is a block diagram illustrating the detailed configurations of the coding unit 101 and the additional information generation unit 102. The coding unit 101 includes, as shown in the diagram, a subtractor 110, an orthogonal transformation unit 111, a quantization unit 112, a variable length coding unit 113, an inverse quantization unit 114, an inverse orthogonal transformation unit 115, an adder 116, a predictive image generation unit 117 and a motion vector estimation unit 118. The coding unit 101 may be configured based on the conventional technique such as MPEG-1, 2, 4, 4 AVC and the like, and the detailed description shall be omitted.

The additional information generation unit 102 includes a high-resolution image generation unit 121, a motion vector estimation unit 122, a spatiotemporal interpolation image generation unit 123, a generation mode selection unit 124 and a variable length coding unit 125.

The high-resolution image generation unit 121 has an internal memory that stores images whose resolutions have already been improved, and the resolution of the low-resolution video data that has been decoded locally in the coding unit 101 is improved by obtaining partial images from the images whose resolution have already been improved and which are stored in the internal memory, using the motion vectors estimated by the motion vector estimation unit 122 (the above-mentioned second to fourth modes). The improvement of the resolution is performed in the second to fourth modes as described in the above-mentioned (B) to (D). Also, the improvement of the resolution is performed in the additional information generation unit 102 and is used by the generation mode selection unit 124 to estimate the generated coding amount and the accuracy of the resolution improvement so as to select a generation mode.

The motion vector estimation unit 122 estimates motion vectors from the high-resolution video data HV1. For example, in the case where the generation mode selected by the generation mode selection unit is the second mode, the motion vector estimation unit 122 estimates a motion vector in a forward image determined as a searching target, out of the images whose resolutions have already been improved. Likewise, in the case where the third mode is selected, the motion vector estimation unit 122 estimates a motion vector in a backward image determined as a searching target, and also in the case where the fourth mode is selected, the motion vector estimation unit 122 estimates forward and backward motion vectors or a plurality of motion vectors of the same direction.

Figure 3:
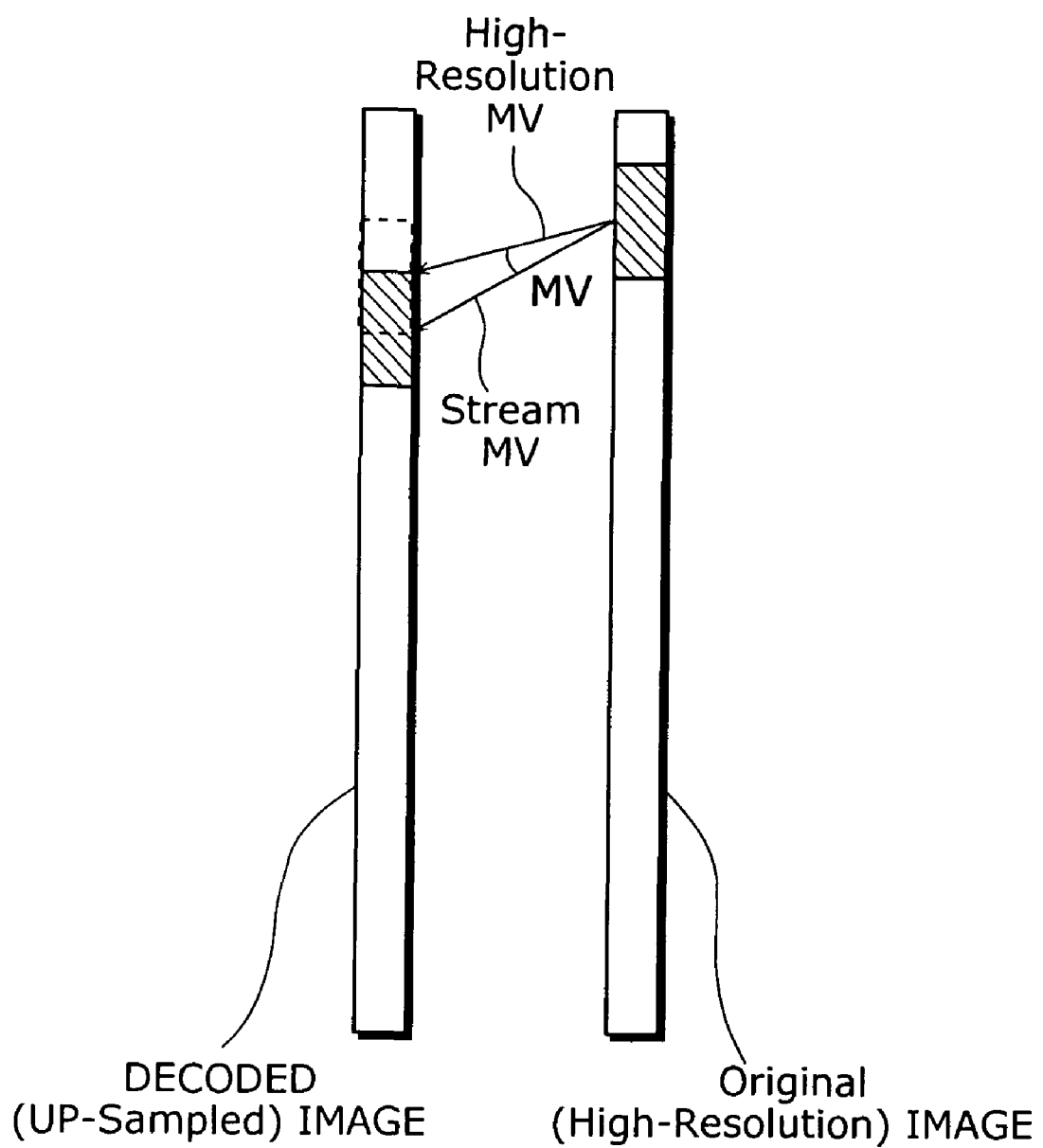
FIG. 3 is a schematic diagram showing difference motion vector.

FIG. 3 is a schematic diagram showing difference motion vector. In the right, a present input image included in the high-resolution video data is shown, and in the left, an image whose resolution has already been improved is shown. The hatched part in the right bar is a block, in an input image, in which motion vectors are to be estimated. The part indicated by a broken line in the left bar is an area of a similar (or same) partial image, searched out from the image whose resolution has already been improved. In other words, the high-resolution MV in the diagram denotes a motion vector estimated by the motion vector estimation unit 122.

The hatched part in the left bar is the area of the partial image, estimated in the corresponding low-resolution image by the motion vector estimation unit 118. The stream MV in the diagram denotes a motion vector estimated from the low-resolution image by the motion vector estimation unit 118. Note that, in the diagram, the high-resolution MV and the stream MV are scaled to be of the same size.

The variable length coding unit 125 codes a difference motion vector between the high-resolution MV and the stream MV. This can reduce the coding amount of the motion information. As shown in FIG. 3, the high-resolution MV and the stream MV are likely to take approximately the same value, but the high-resolution MV can represent a motion more accurately.

The spatiotemporally-interpolated image generation unit 123 generates a high-resolution image by interpolating a pixel using the pixels that are located around the pixel in terms of time and space. The improvement of resolution is executed in the first mode as described in the above-mentioned (A).

Figure 4B:
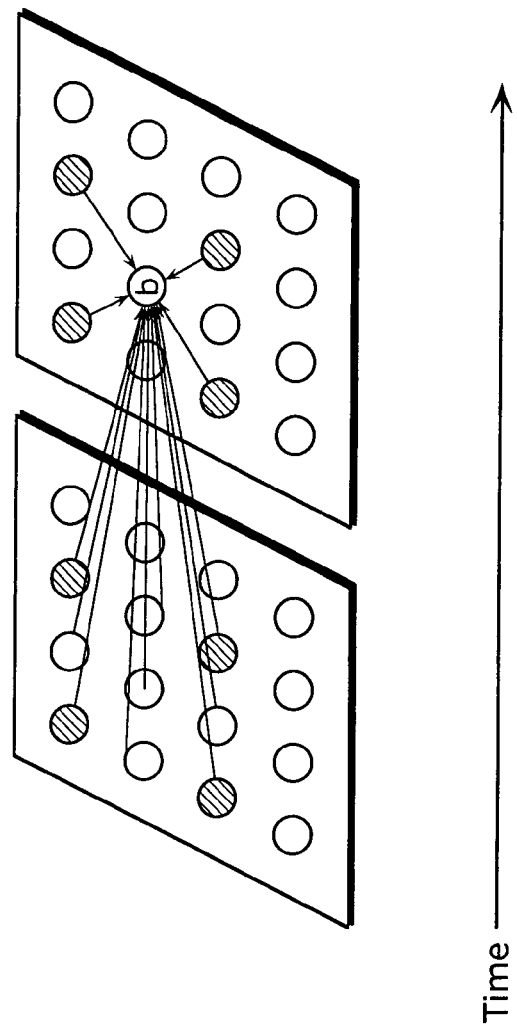
FIG. 4B is a schematic diagram showing the generation of a high-resolution image by spatiotemporal interpolation.
Figure 4A:
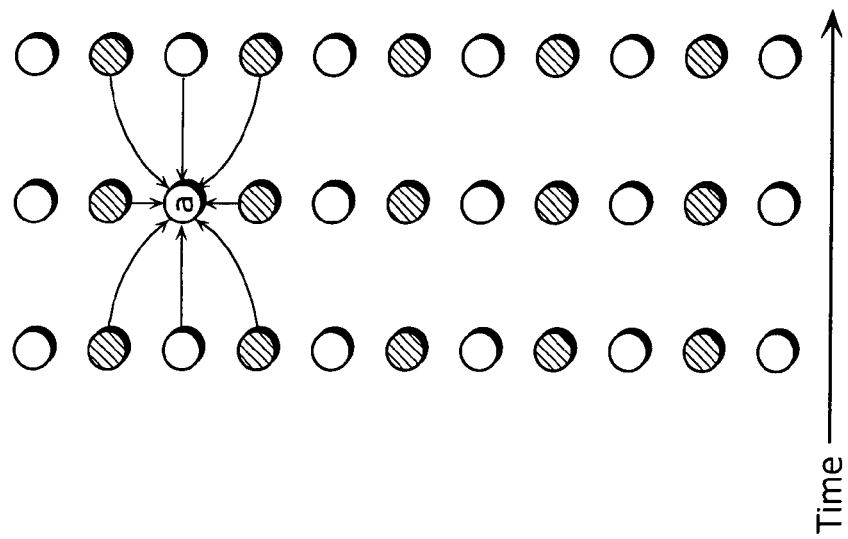
FIG. 4A is a schematic diagram showing the generation of a high-resolution image by spatiotemporal interpolation.

FIGS. 4A and 4B are schematic diagrams showing the generation of a high-resolution image, having the resolution that is doubled both in the horizontal and vertical directions, by spatiotemporal interpolation. In FIG. 4A, vertically-aligned circles represent pixels in a single image. The diagram shows pixels of three images that are displayed at different times. Hatched circles denote pixels of low-resolution image while the non-hatched circles denote pixels of high-resolution image to be interpolated. For example, in the case of generating a pixel "a" shown in FIG. 4A by spatiotemporal interpolation, the interpolation is performed using information on the neighboring pixels as shown in the diagram. Here, pixels in the images of different time whose resolutions have already been improved may be used. Note that information on any pixel may be used as long as they are the pixels neighboring in terms of time and space. An interpolated pixel is generated by weighing each of the neighboring pixels and deriving an average value. Likewise, FIG. 4B shows two images. For example, in the case of generating a pixel indicated as "b" by spatiotemporal interpolation, the interpolation is performed using the pixels neighboring in terms of time and space.

As described above, the spatiotemporally-interpolated image generation unit 123 interpolates pixels by filtering the spatiotemporally neighboring pixels.

The generation mode selection unit 124 selects a generation mode (conversion mode as mentioned above) of high-resolution image on a block basis. As to the selection standard, for example, a generation mode may be firstly selected from the modes as described in the above-mentioned (A) to (D) in association with the four coding modes (a) to (d) in the coding unit 101, or the generation mode may be selected after the evaluation of the generated coding amount and the accuracy of high-resolution image, according to the result of the evaluation. The four coding modes in the coding unit 101 are (a) an intra coding mode, (b) a forward predictive coding mode, (c) a backward predictive coding mode and (d) a bi-directional predictive coding mode.

Figure 5:
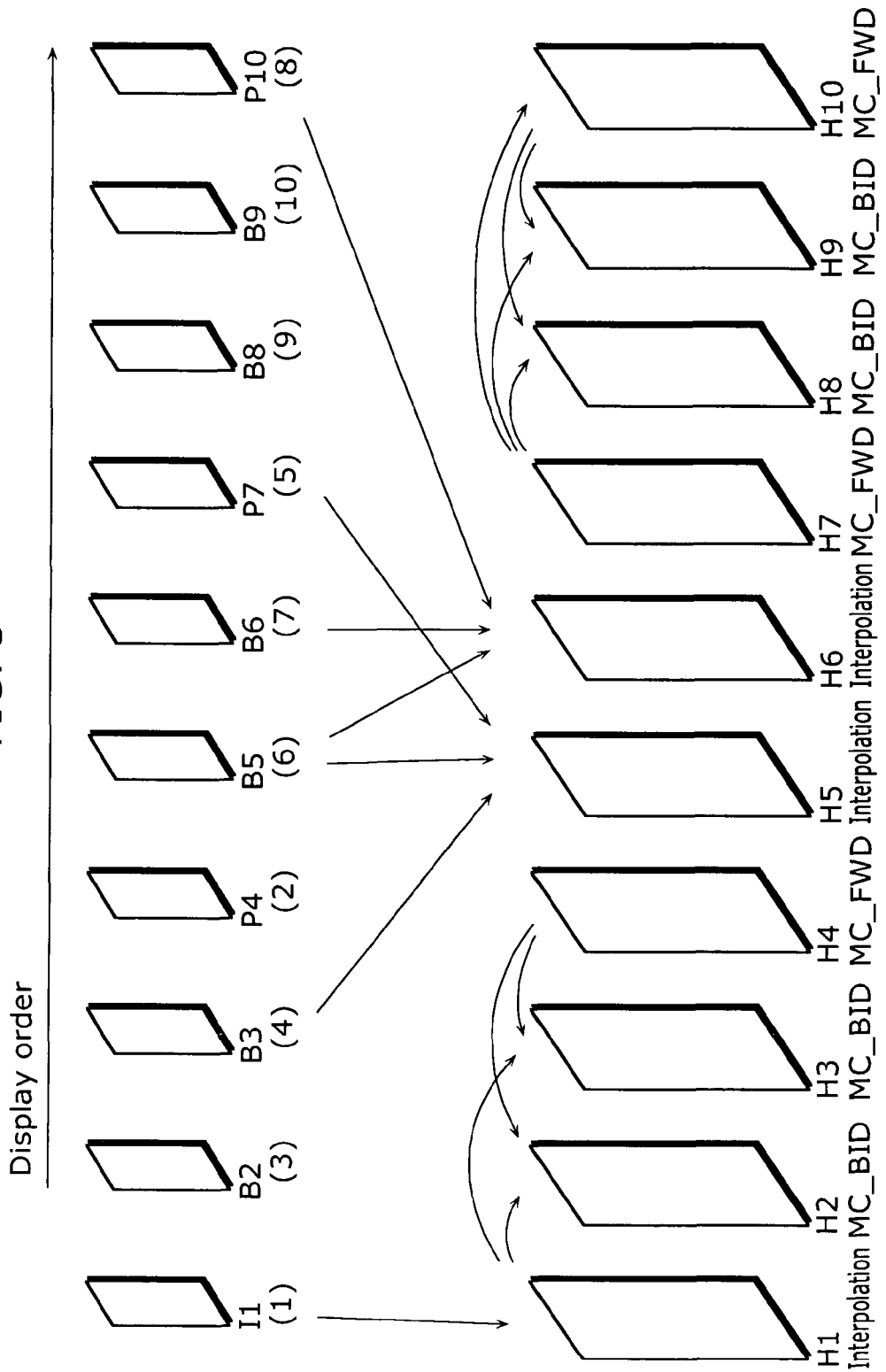
FIG. 5 is a schematic diagram showing a relationship between low-resolution images and high-resolution images.

FIG. 5 is a diagram showing the relationship between a low-resolution images and high-resolution images. I1, B2, B3 and the following in the upper sequence represent the low-resolution images in a display order. "I" denotes an intra-coded picture as obtained in the mode (a). "P" denotes a unidirectional predictive coded picture as obtained in the mode (b) or (c). "B" shows a bi-directional predictive coded picture as obtained in the mode (d). The numbers next to I, B and P indicate a display order. Note that numbers in parentheses indicate a coding order.

H1, H2, H3 and the following in the lower sequence in the diagram represent the high-resolution images corresponding to the low-resolution images. In the example shown in the diagram, the resolutions of the pictures H1, H5 and H6 are improved by the spatiotemporal interpolation of the first mode as described in the above-mentioned (A). The resolutions of the pictures H2, H3, H8 and H9 are improved by the spatiotemporal interpolation in the mode as described in the above-mentioned (A), or through the obtainment of a partial image from another picture whose resolution has already been improved according to one of the modes as described in the above-mentioned (B) to (D). The resolutions of the pictures H4, H7 and H10 are improved by spatiotemporal interpolation in the mode as described in the above-mentioned (A), or through the obtainment of a partial image from a forward picture whose resolution has already been improved, based on the motion vectors obtained in the mode as described in the above-mentioned (B). However, a different mode may be employed depending on a block in a picture.

In the case where the generation mode selected by the generation mode selection unit 124 (conversion mode as mentioned above) is the first mode, the variable length coding unit 125 variable length codes conversion mode information indicating the first mode, as additional information. In the case where the selected generation mode is one of the second to fourth modes, the variable length coding unit 125 variable length codes conversion mode information and motion information as additional information. At that time, the variable length coding unit 125 variable length codes the motion information as a difference motion vector.

Figures 6A, 6B:
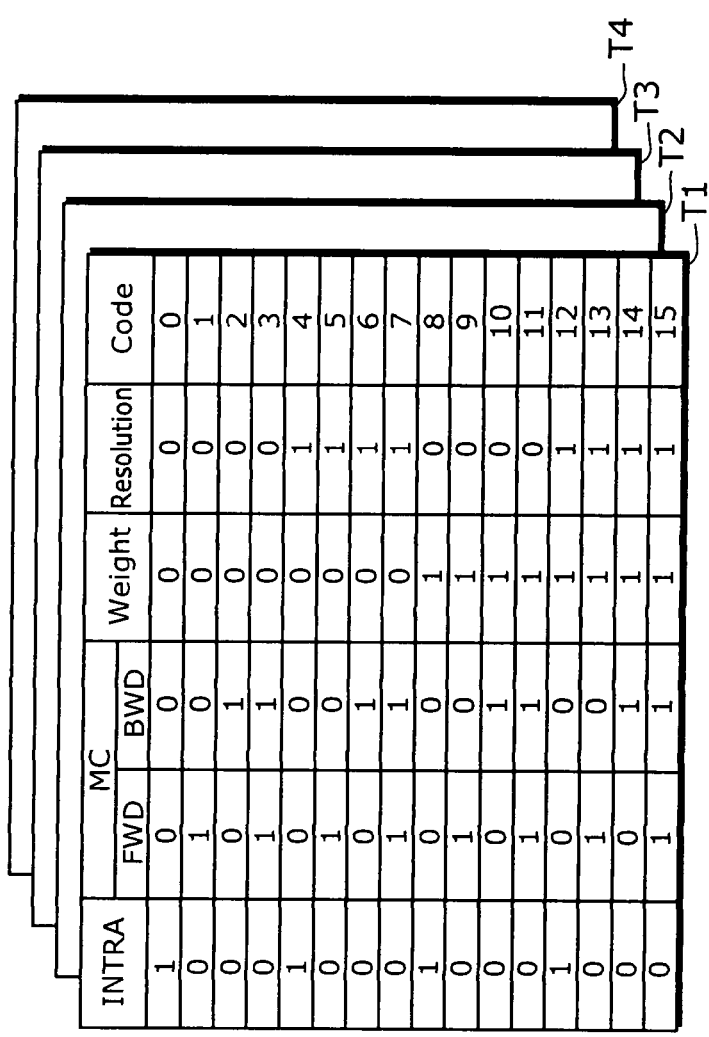
FIG. 6A is a diagram showing codes of interpolated-image generation modes.
FIG. 6B is a diagram showing codes of interpolated-image generation modes.

FIGS. 6A and 6B are schematic diagrams indicating codes of the generation modes.

In FIG. 6A, the coding mode columns show coding modes of low-resolution images. In other words, "INTRA" denotes the mode (a), "INTER-FWD" denotes the mode (b), "INTER-BWD" denotes the mode (c) and "INTER-BID" denotes the mode (d).

The interpolation generation mode columns show generation modes (conversion modes) of the corresponding high-resolution images. Namely, "INTRA interpolation" denotes the mode as described in the above-mentioned (A), "MC FWD" denotes the mode as described in the above-mentioned (B), "MC BWD" denotes the mode as described in the above-mentioned (C) and "MC BID" denotes the mode as described in the above-mentioned (D). "MC Weight" denotes generation of high-resolution images based on a linear prediction which includes weighing, using a plurality of images whose resolutions have already been improved in the case of the mode as described in the above-mentioned (D). "INTRA interpolation Weight" denotes generation of high-resolution images by filtering which includes weighing, using a plurality of images whose resolutions have already been improved in the case of the mode as described in the above-mentioned (A). "INTRA-MC Mixed" denotes generation of high-resolution images by mixing the mode as described in the above-mentioned (A) with one of the modes as described in the above-mentioned (B) to (D).

In the example shown in FIG. 6A, the codes of the generation modes are assigned in association with the coding modes of the blocks in the low-resolution images corresponding to the blocks in the high-resolution images. In other words, the codes of the generation modes are assigned so that a code becomes shorter (indicates "0") in the case where the coding mode and the generation mode are of the same type. Focusing on the generation mode column "MC BID", in the case where the generation mode of a certain block in a high-resolution image is "MC BID", when the coding mode of the block in the corresponding low-resolution image is "INTER-BID", "INTER-BWD", "INTER-FWD" and "INTRA", the code of the block in the high-resolution image is "0", "3", "3" and "6", respectively.

FIG. 6B is a diagram showing, in detail, variable length coding tables of the generation modes.

Table T1 in FIG. 6B shows the variable length coding table in the case where the coding mode is the mode (a). Likewise, table T2, T3 and T4 respectively show a variable length coding table in the case where the coding mode is the modes (b), (c) and (d), respectively. For example, in the case where the coding mode is intra coding of the mode (a) and the generation mode is spatiotemporal interpolation of the mode as described in the above-mentioned (A), the code of the generation mode is "0". In the case where the coding mode is intra coding of the mode (a) and the generation mode is forward motion vector of the mode (B), the code of the generation mode is "1". In the tables T1 to T4, shorter codes are assigned in the case where the coding mode and the generation mode are of the same type.

Note that coding of the generation mode is not limited to this. For example, the encoding method using probability of generation codes (a so-called arithmetic coding) may be used.

Figure 7:
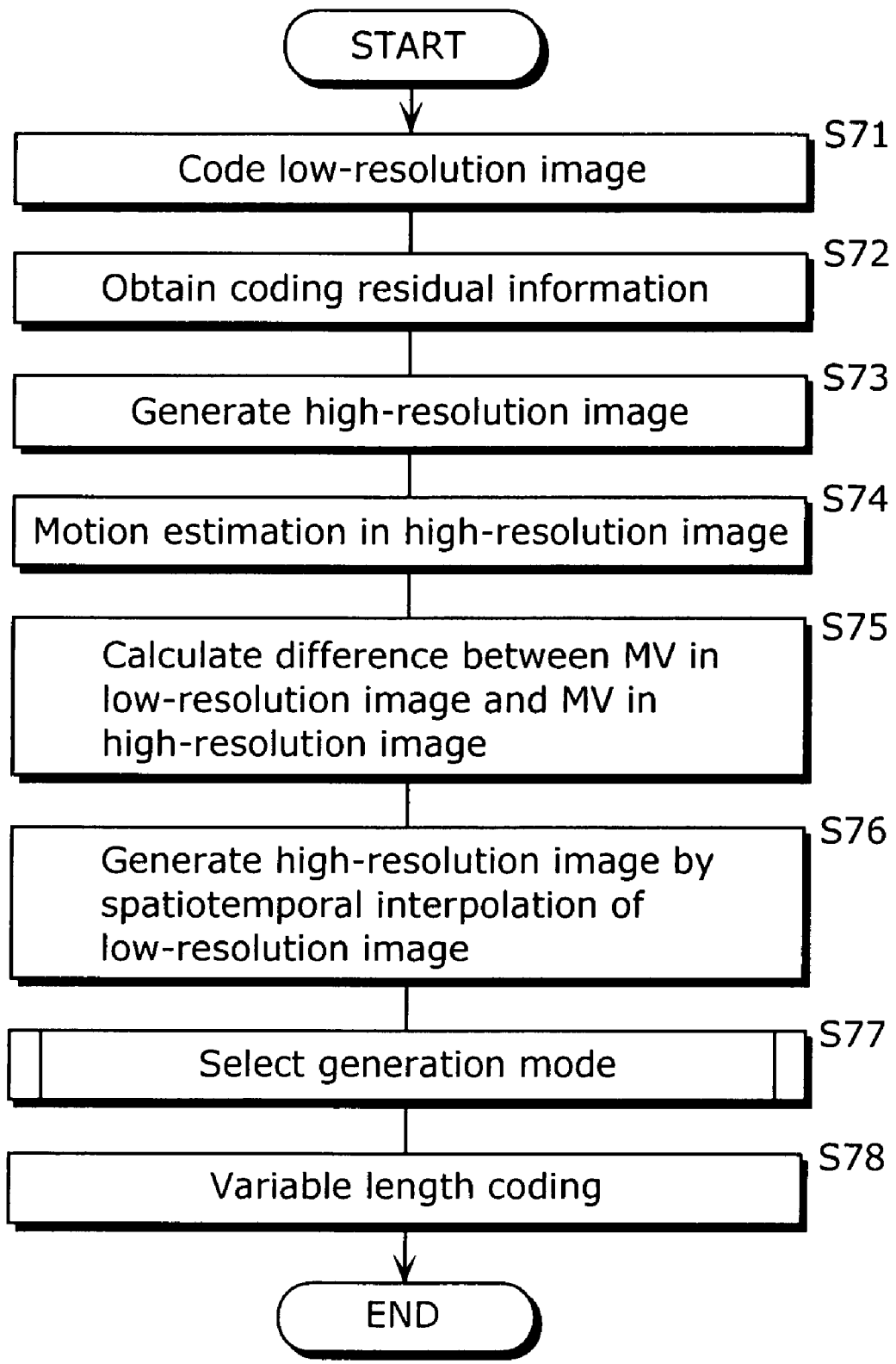
FIG. 7 is a flowchart showing image coding processing.

FIG. 7 is a flowchart showing the image coding processing and the additional information generation processing performed in the coding unit 101 and the additional information generation unit 102.

As shown in the flowchart, the coding unit 101 performs coding on a block basis (to be more specific, on a macroblock basis) (S71), and the generation mode selection unit 124 obtains coding residual of the macroblock from the variable length coding unit 113 (S72). Here, a locally-decoded picture of low-resolution image is stored on a block basis in a reference memory in the prediction image generation unit 117.

Meanwhile, the high-resolution image generation unit 121 and the spatiotemporally-interpolated image generation unit 123 generate a high-resolution image corresponding to the coded low-resolution image (S73). The motion vector estimation unit 122 estimates a motion vector of an image of newly-inputted high-resolution video data HV1, in the generated high-resolution image determined as a searching target (S74), and calculates a difference motion vector between the motion vector estimated by the motion vector estimation unit 118 and the motion vector of the high-resolution image (S75). The spatiotemporally-interpolated image generation unit 123 generates a high-resolution image by spatiotemporally interpolating the corresponding low-resolution image (S76).

In addition, the generation mode selection unit 124 selects a suitable generation mode based on the coding residual and the motion vectors of low-resolution image (S77). The variable length coding unit 125 performs variable length coding on the additional information (S78). In other words, the variable length coding unit 125 codes the selected generation mode and also codes the difference motion vector in the case where the selected generation mode is one of the second to fourth modes.

Figure 8:
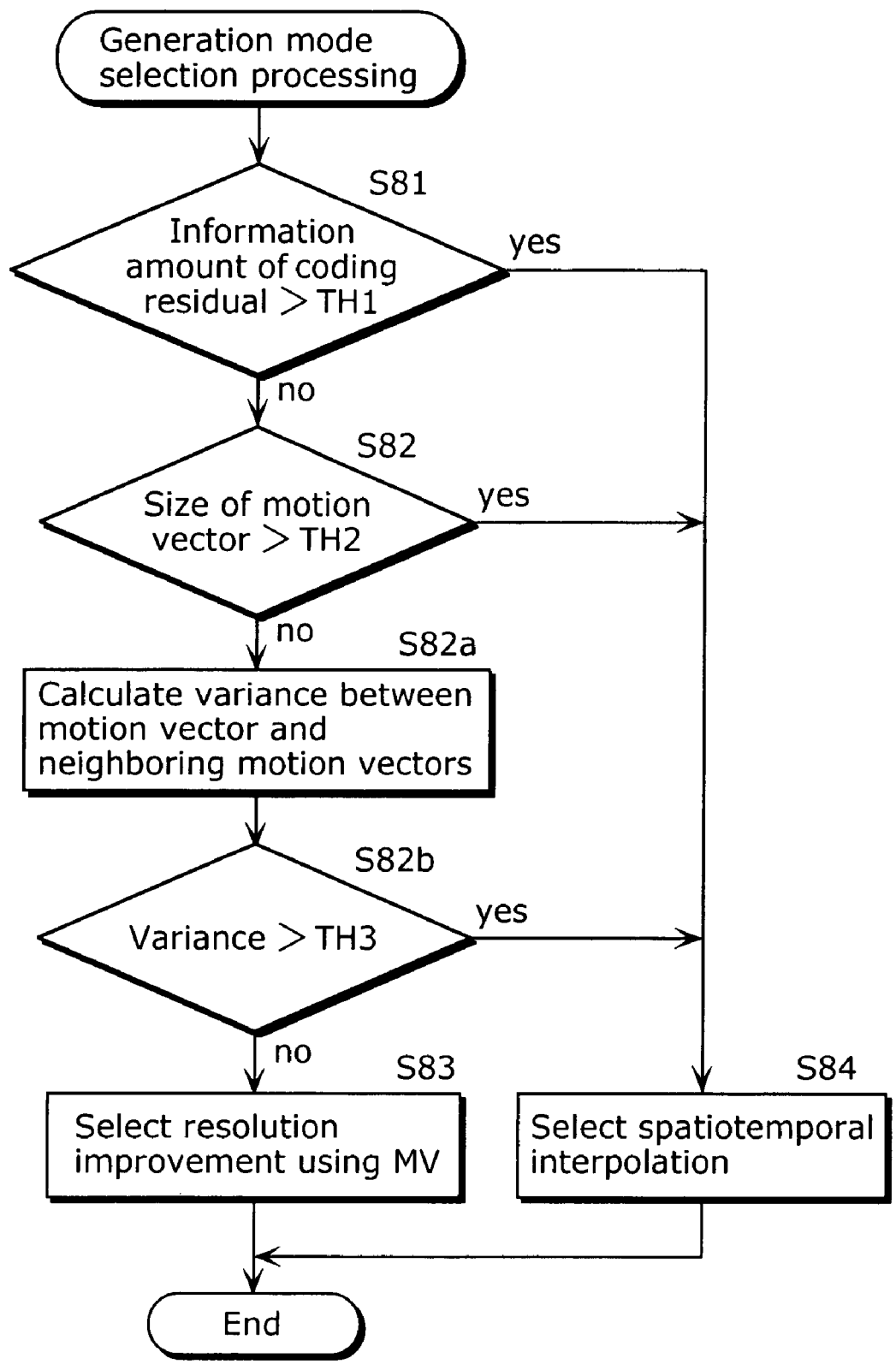
FIG. 8 is a flowchart showing generation mode selection processing.

FIG. 8 is a flowchart showing the generation mode selection processing described in S77 in FIG. 7.

In the case where the amount of information on coding residual obtained in S72 is smaller than a threshold TH1 and the motion vector estimated in S74 or the motion vector estimated by the motion vector estimation unit 118 is smaller than a threshold TH2, the generation mode selection unit 124 selects, as a generation mode, a mode corresponding to the coding mode from the first to fourth modes (resolution improvement using motion vectors, as described in the above-mentioned (B) to (D)) (S83).

Moreover, in the case where the amount of information on coding residual obtained in S72 is greater than the threshold Th1, or the motion vector estimated in S74 or the motion vector estimated by the motion vector estimation unit 118 is greater than the threshold TH2, the generation mode selection unit 124 selects, as the generation mode, the first mode resolution improvement using spatiotemporal interpolation, as described in the above-mentioned (A)) (S84).

In the generation mode selection processing, when a motion between a high-resolution image and a low-resolution image is large, an increase in the coding amount is suppressed by the use of the first mode as the generation mode. In the case where the motion vector does not have correlation with the neighboring motion vectors, there might be a possibility that an erroneous motion vector is estimated. The generation mode selection unit 124 therefore selects the first mode (resolution improvement by spatiotemporal interpolation as described in the above-mentioned (A)) as the generation mode. To be more specific, the generation mode selection unit 124 calculates the variance between the motion vector and the neighboring motion vectors (S82a), and selects the first mode (S84) in the case where the value is larger than the threshold (S82b).

Figure 9A:
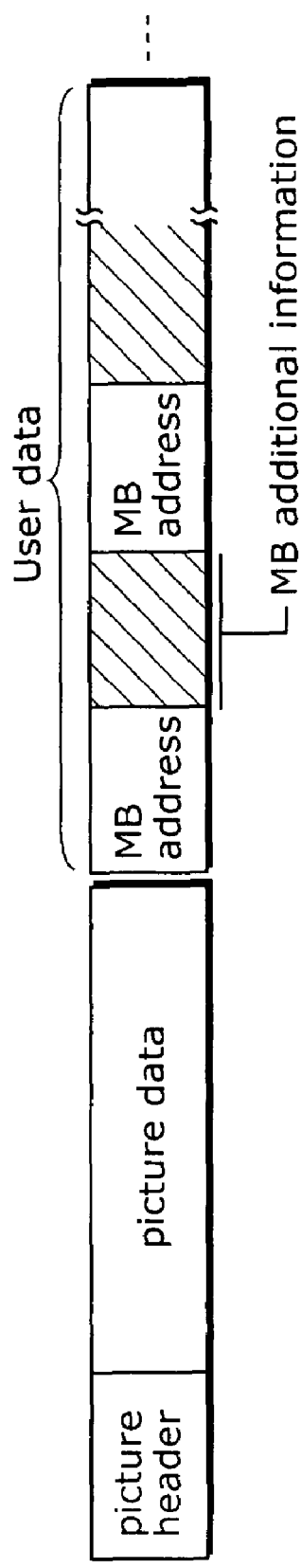
FIG. 9A is a schematic diagram showing a stream format of additional information associated with stream data.
Figure 9B:
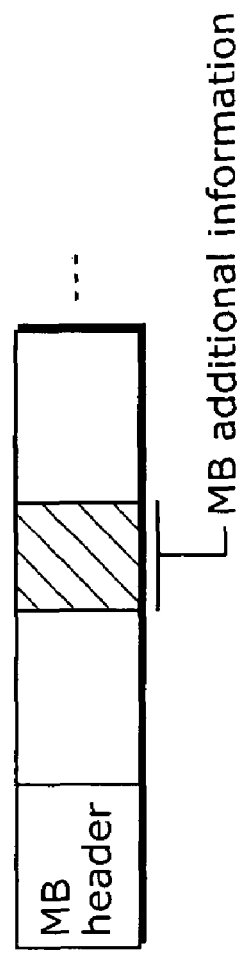
FIG. 9B is a schematic diagram showing a stream format of additional information associated with stream data.

FIGS. 9A and 9B are schematic diagrams showing examples of a stream format of the additional information associated with the stream data by the variable length coding unit 125.

FIG. 9A shows an example of a format for adding additional information as user data on a picture basis. In other words, the additional information per macroblock is added, as user data, to the stream data portion made up of a picture header and picture data. The user data is data that may be arbitrarily determined by the user during the data streaming.

FIG. 9B shows an example of a format for embedding the additional information into the stream data. In FIG. 9B, additional information per macroblock is embedded in macroblock data. In the diagram, data amount can be reduced more than the case of FIG. 9A because no macroblock address is necessary.

Note that the configuration, in which the additional information is substantially embedded into the stream data by information embedding technology such as an electronic watermark technology, and the embedded stream data is transferred, may be applied. For example, the coding unit 101 may obtain the additional information from the additional information generation unit 102, and embed the additional information into current image data to be coded, within the range of not degrading the quality of decoded pictures, using the electronic watermark technology. The electronic watermark technology includes a time-base difference embedding, a space-base difference embedding, a layered structure embedding, a wavelet transform and a spread spectrum.

Figure 10:
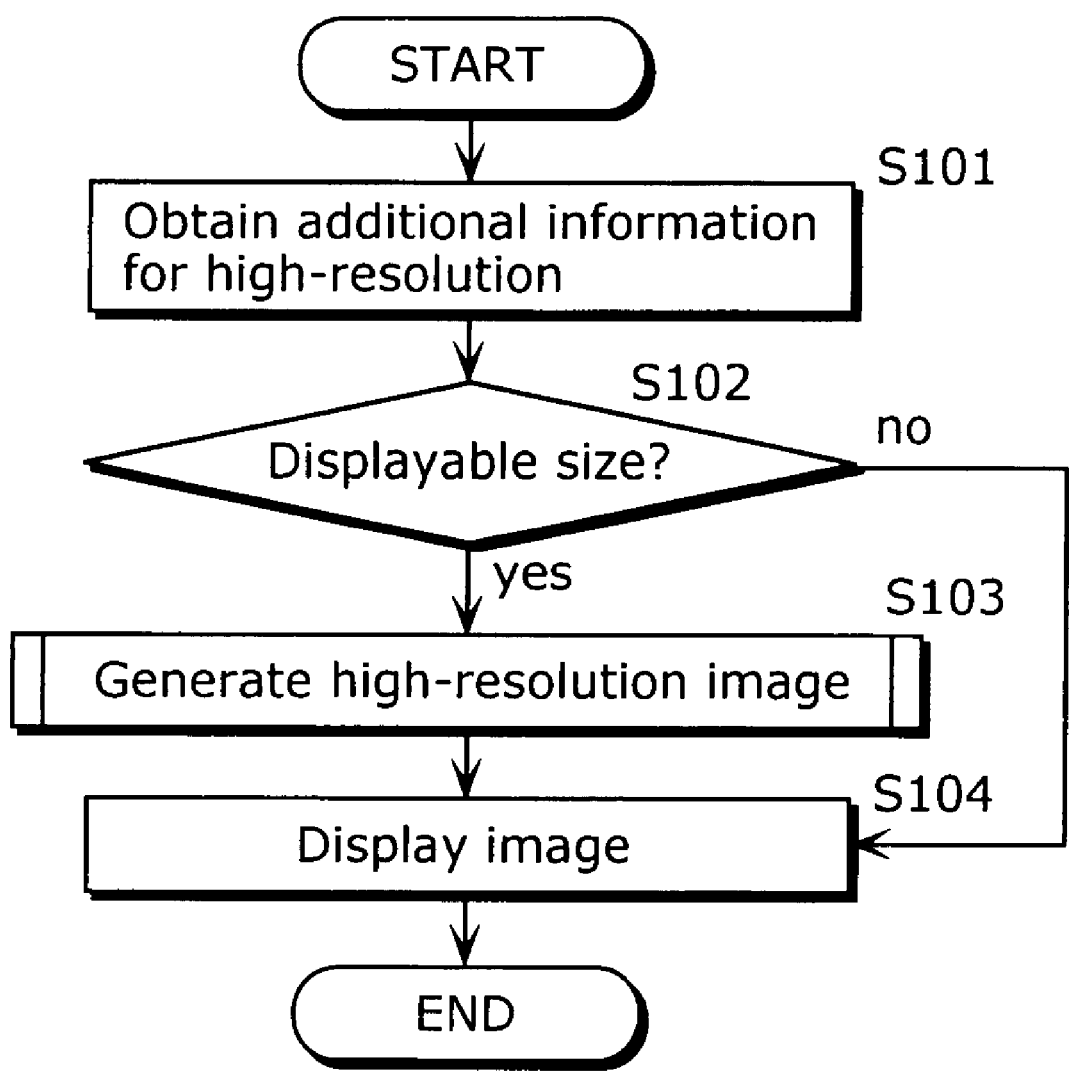
FIG. 10 is a flowchart showing decoding processing.

FIG. 10 is a flowchart showing decoding processing performed in the decoder 2.

Upon obtaining the additional information (S101), the decoder 2 judges whether or not the images can be displayed on a display that is connected to the decoder 2 (S102). In the case where the images cannot be displayed, the decoder 2 outputs, for display, the low-resolution video data LV2 decoded by the decoding unit 201 (S104). In the case where the images can be displayed, the decoder 2 generates high-resolution images from the low-resolution video data LV2 decoded by the decoding unit 201 (S103), and outputs the generated high-resolution images on the display (S104).

Figure 11A:
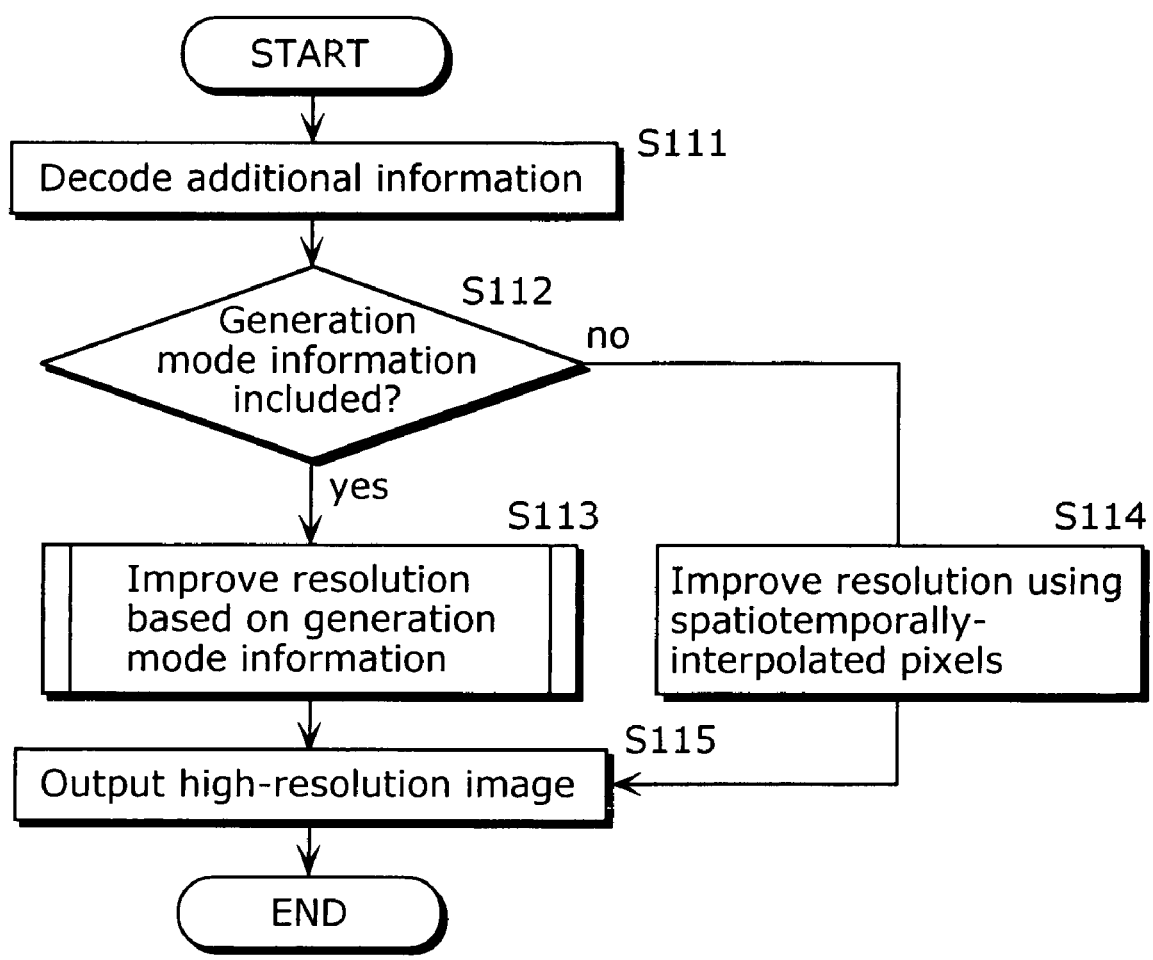
FIG. 11A is a flowchart showing the processing of high-resolution image generation in Step S103 in FIG. 10.

FIG. 11A is a flowchart showing the high-resolution image generation processing described in S103 in FIG. 10.

The up-conversion unit 202 performs variable length decoding on the additional information (S111), judges whether or not the generation mode information (i.e. conversion mode information) is included in the additional information (S112). In the case where the generation mode information is included in the additional information (S113), the up-conversion unit 202 generates high-resolution images according to the generation mode information. In the case where the generation mode information is not included in the additional information, the up-conversion unit 202 generates high-resolution images by spatiotemporal interpolation (S114), and outputs the generated high-resolution images (S115).

Note that the high-resolution image generation processing is performed on a macroblock basis in the case, for example, where the additional information is added per macroblock, whereas it is performed on a picture basis in the case where the additional information is added per picture.

Figure 11B:
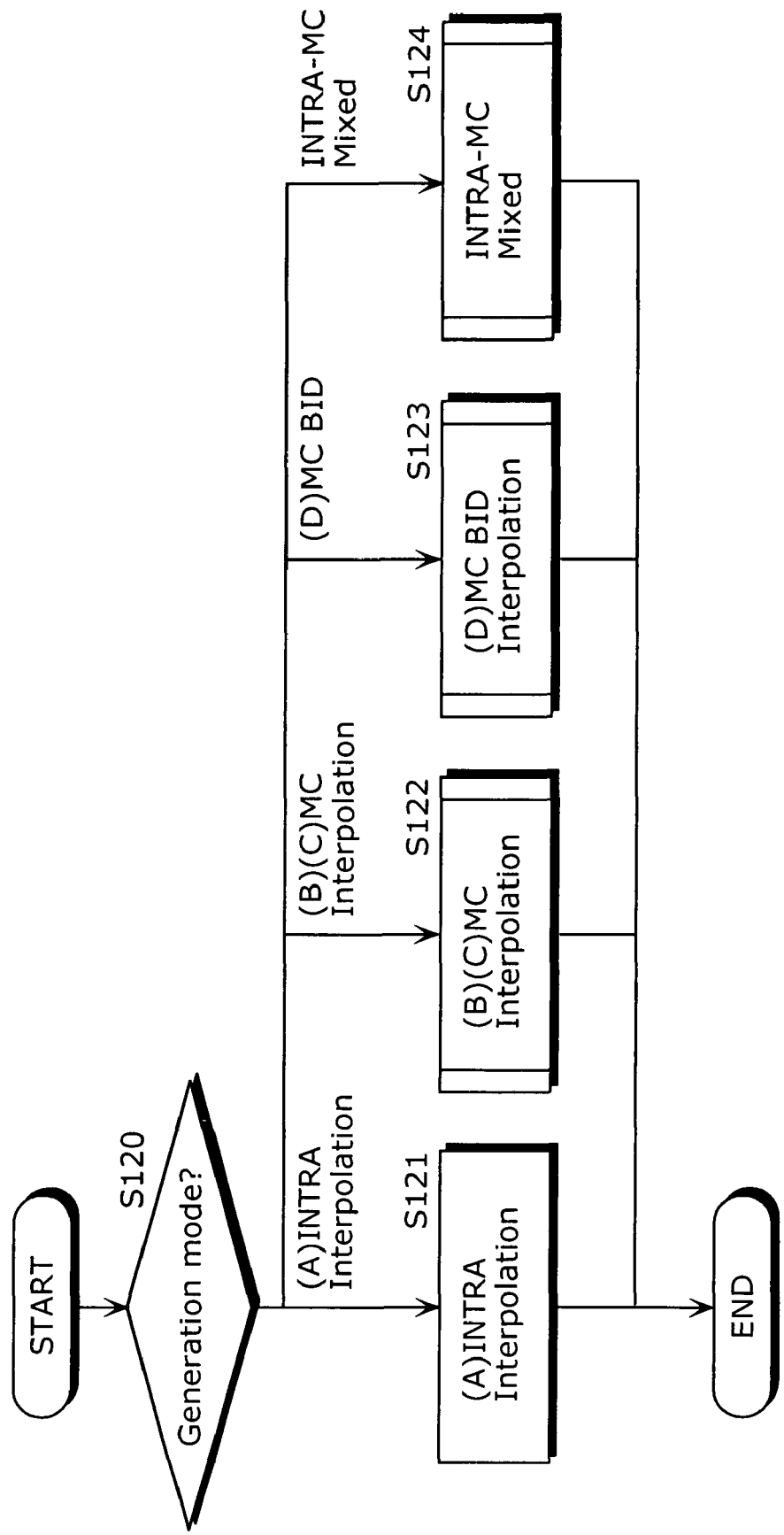
FIG. 11B is a flowchart showing in detail the high-resolution processing described in Step S113 in FIG. 10.

FIG. 11B is a flowchart showing the outline of the resolution improvement described in S113 in FIG. 11A. As shown in the diagram, the up-conversion unit 202 judges the generation mode information (i.e. conversion mode information) in the additional information (S120), and in the case where the generation mode information indicates INTRA interpolation as described in the above-mentioned (A), performs INTRA interpolation (S121). In the case where the generation mode information indicates MC FWD as described in the above-mentioned (B) or MC BWD as described in the above-mentioned (C), the up-conversion unit 202 performs MC interpolation (S122), and in the case where the generation mode information indicates MC BID as described in the above-mentioned (D), the up-conversion unit 202 performs MC BID interpolation. In the case where the generation mode information indicates INTRA-MC mixed interpolation, the up-conversion unit 202 performs INTRA-MC mixed interpolation (S124).

Note that FIG. 11B describes the case where the generation mode information is included in the additional information. However, even in the case where the generation mode information is not included, any one of the interpolation processes may be selected according to certain rules. For example, an interpolation process may be selected in accordance with a coding mode (one of the above-mentioned modes of (a) intra coding mode, (b) a forward predictive coding mode, (c) a backward predictive coding mode, and (d) a bi-directional predictive coding) of a low-resolution image corresponding to an image whose resolution is to be improved by interpolation.

Figure 11C:
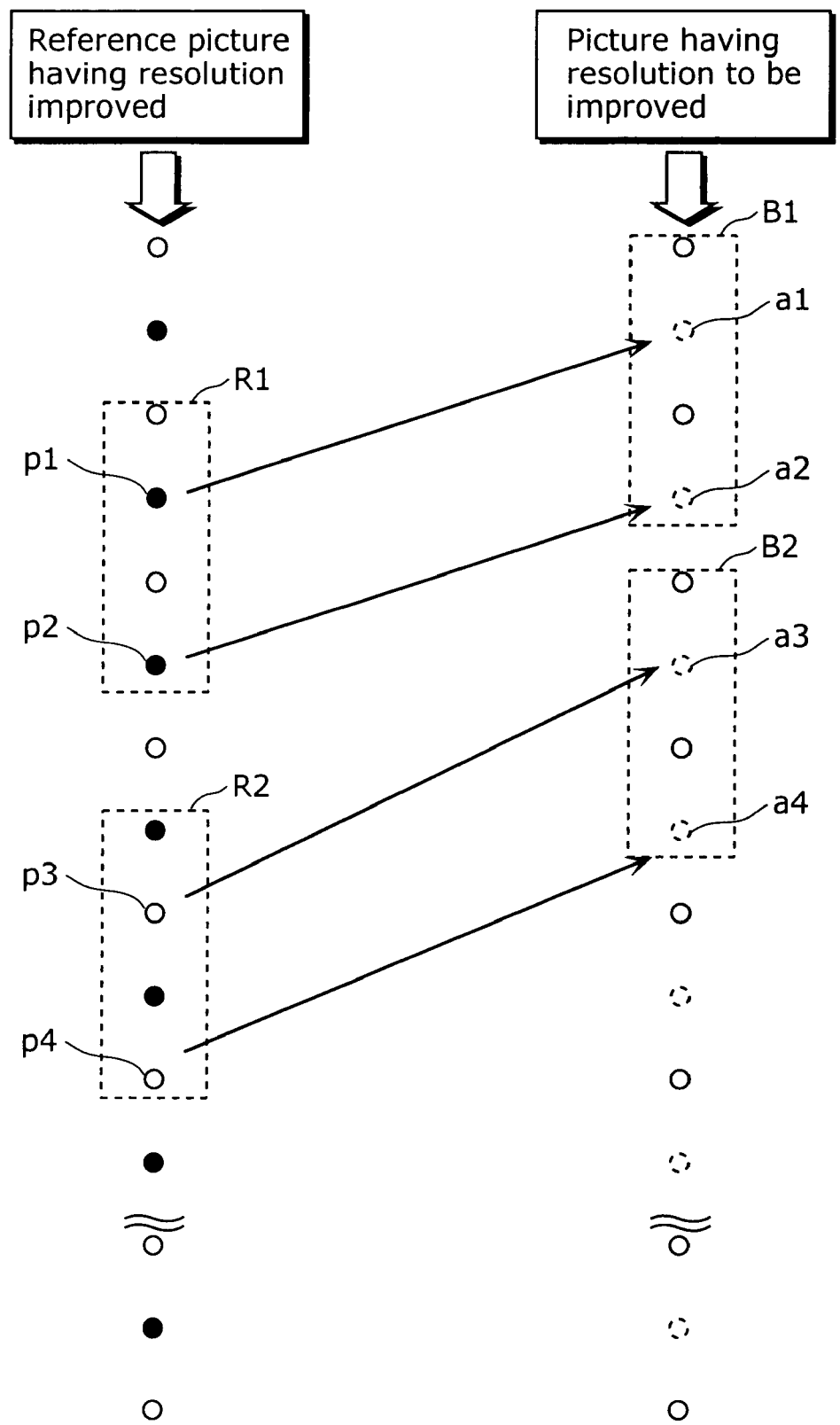
FIG. 11C is a schematic diagram showing MC interpolation.

FIG. 11C is a schematic diagram showing the MC interpolation described in S122 in FIG. 11B. In the left, one horizontal or vertical line of pixels of a reference picture whose resolution has already been improved are shown. The white circles denote pixels included in a low-resolution image while the black circles denote interpolated pixels. In the right, one horizontal or vertical line of pixels in an image whose resolution is to be improved are shown. The white circles denote pixels included in a low-resolution image while dotted circles denote the pixels to be interpolated. It is assumed here that a motion vector of a block B1 in the image to be processed indicates an area R1 in the image whose resolution has already been improved. In this case, the up-conversion unit 202 interpolates a pixel to be interpolated, in a pixel positional in the block B1, using a pixel value of a pixel p1 in the area R1, and interpolates a pixel to be interpolated, in a pixel position a2 in the block B1, using a pixel value of a pixel p2 in the area R1.

It is also assumed here that a motion vector of a block B2 in the image to be processed indicates an area R2 in the image whose resolution has already been improved. In this case, the up-conversion unit 202 interpolates a pixel to be interpolated, in a pixel position a3 in the block B2, using a pixel value of a pixel p3 in the area R2, and interpolates a pixel to be interpolated, in a pixel position a4 in the block B2, using a pixel value of a pixel p4 in the area R2.

The diagram shows the case where the interpolation generation mode is (B) MC-FWD and (C) MC-BWD. In the case where the interpolation generation mode is (D) MC-BID, the up-conversion unit 202 calculates a pixel value of the pixel to be interpolated, by weighing two pixel values obtained from two images whose resolutions have already been improved and deriving an average value of the weighed pixel values.

Figure 11D:
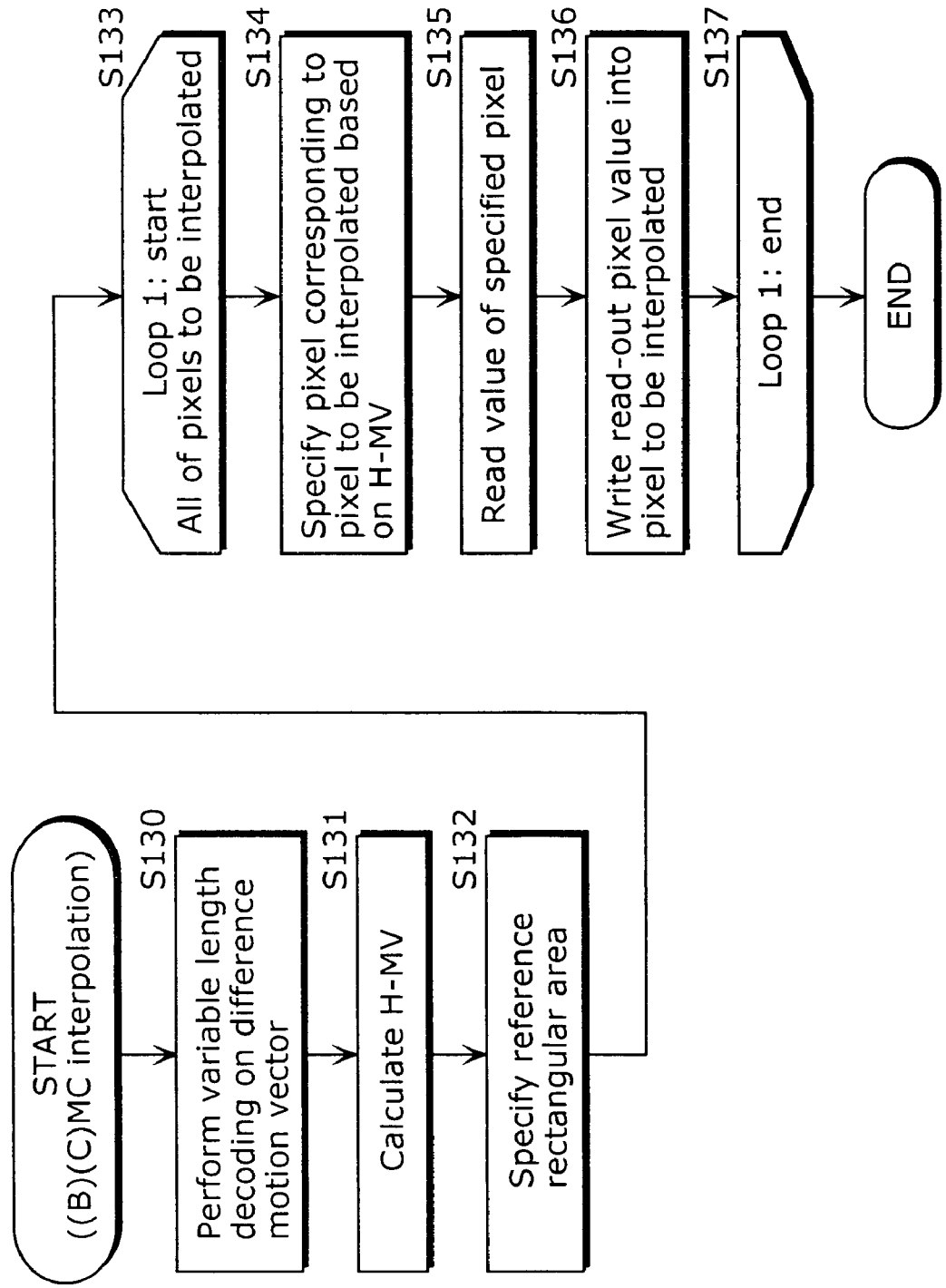
FIG. 11D is a flowchart showing, in more detail, the MC interpolation described in Step S122 in FIG. 11B.

FIG. 11D is a flowchart showing, in detail, the MC interpolation described in S122 in FIG. 11B. The flowchart shows the processing performed for one block in the case of improving, on a block basis, the resolution of the image to be processed. The decoder 2 has a memory for holding images whose resolution improvements have been completed and images to be processed. The images whose resolution improvements have been completed are referred to in the interpolation using motion vectors. An image to be processed is made up of pixels constituting a low-resolution image and pixels to be interpolated.

First, the up-conversion unit 202 performs variable length decoding on the difference motion vector included in the additional information (S130), calculates a motion vector H-MV intended for high-resolution images, by adding the obtained difference to the corresponding motion vector of the low-resolution image (S131), and specifies a rectangular area in a reference image whose resolution has already been improved (S132).

Then, the up-conversion unit 202 interpolates all the pixels to be interpolated within a block in loop 1 (S133-S137). In loop 1, the up-conversion unit 202 specifies the pixels corresponding to the pixels to be interpolated in the specified rectangular area (S134), reads out the values of the specified pixels from a memory (S135), and writes the readout pixel values into a memory (S136), as the values of the pixels, in a block, to be interpolated (S136). Thus, all the pixels to be interpolated in the image to be processed, are interpolated using the pixel values which are read from the reference image according to the respective motion vectors.

Figure 11E:
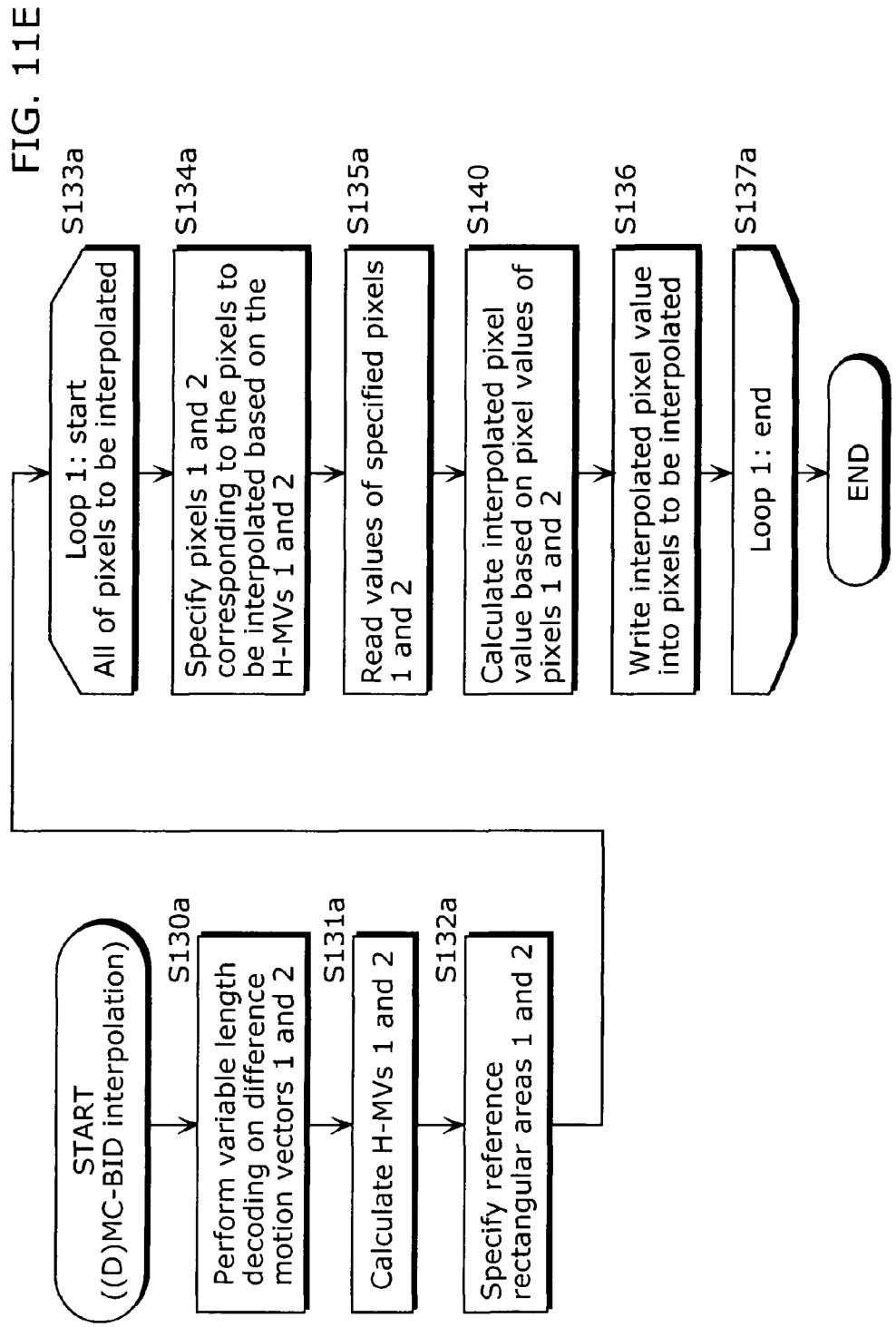
FIG. 11E is a flowchart showing the MC-BID interpolation described in Step S123 in FIG. 11B.

FIG. 11E is a flowchart showing, in detail, the MC-BID interpolation described in Step 123 in FIG. 11B. FIG. 11E is different from FIG. 11D in that it includes an additional step S140 as well as Steps S130a to S135a and S137a instead of Steps S130 to S135 and S137. The following description shall omit the similarities and mainly focus on the differences.

First, the up-conversion unit 202 performs variable length decoding on two difference motion vectors included in the additional information (S130a), calculates two motion vectors H-MV1 and H-MV2 intended for high-resolution images, by adding the obtained two differences to the two corresponding difference motion vectors of low-resolution images (S131a), and specifies two rectangular areas in two reference images whose resolutions have already been improved (S132a).

The up-conversion unit 202 then interpolates all the pixels to be interpolated within the block in loop 1 (S133a to S137a). In loop 1, the up-conversion unit 202 specifies, in the specified two rectangular areas, two pixels to be interpolated (S134a), and reads out the values of the specified two pixels from a memory (S135a). In addition, the up-conversion unit 202 calculates a weighted average of the two readout pixel values. The weight of each of the pixel values may be determined, for example, according to a distance from an image to be processed to each reference image. The weight may be changed according to the size of the motion vectors corresponding to the two pixels values. For example, the weight of the pixel value corresponding to the smaller one of the two motion vectors may be made greater than the weight of the other pixel value. The result of the weighted average calculation is written in the memory as a value of the pixel to be interpolated (S136). As described above, in the MC-BID interpolation, all the pixels to be interpolated in a current image to be processed are interpolated based on two pixel values which are read from two reference images according to two motion vectors.

Note that, in the MC-BID interpolation shown in FIG. 11E, two motion vectors and two reference images are used; however, three or more motion vectors and reference images may be used.

Figure 11F:
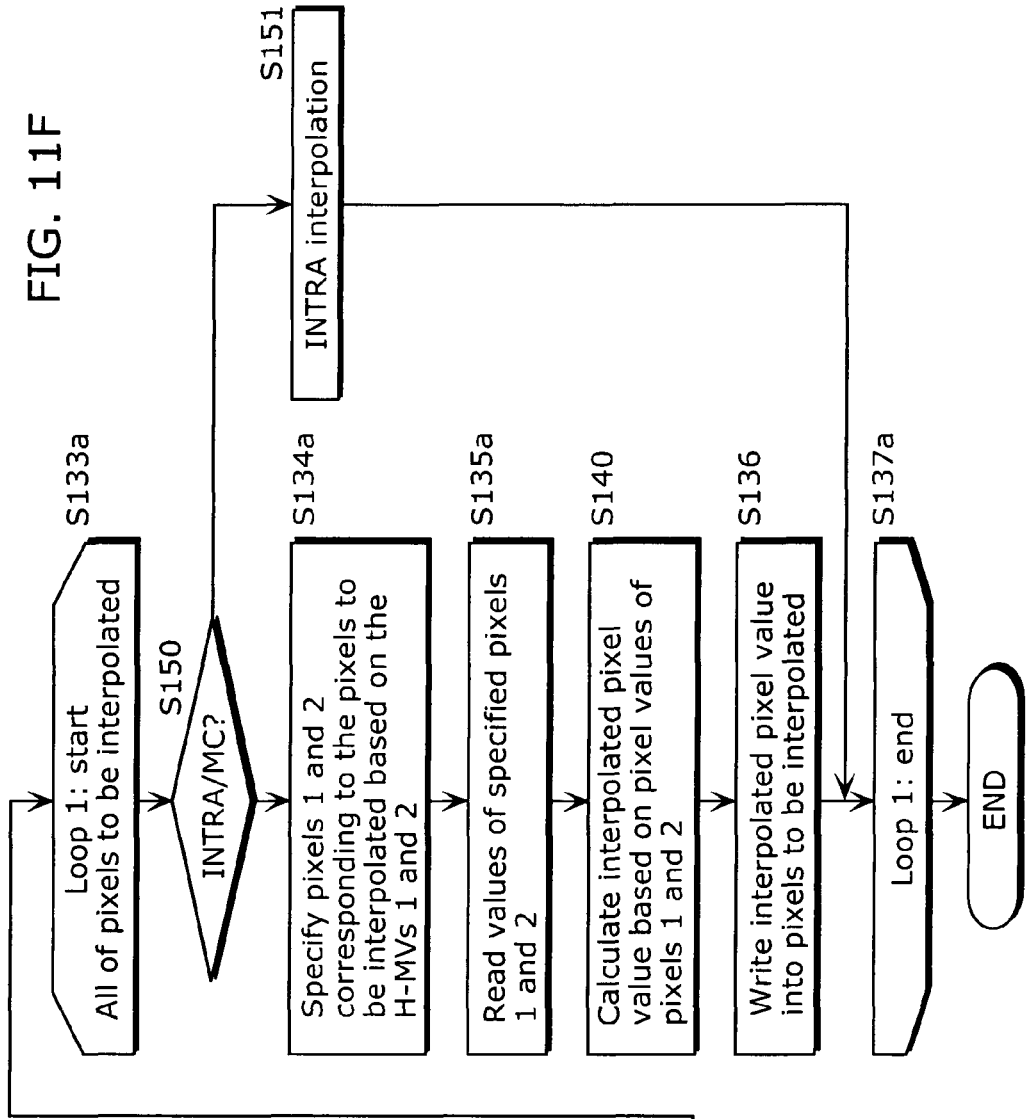
FIG. 11F is a flowchart showing the INTRA-MC mixed interpolation described in Step S124 in FIG. 11B.

FIG. 11F is a flowchart showing, in detail, the INTRA-MC mixed interpolation described in S124 in FIG. 11B. FIG. 11F differs from FIG. 11E in that it has additional steps of S150 and S151. The following description shall omit the similarities and mainly focus on the differences.

In S150, the up-conversion unit 202 judges whether the pixels to be interpolated shall be interpolated by INTRA interpolation or MC interpolation. The judgment may be made based on a position, in a block, of a pixel to be interpolated, or whether or not the neighboring pixels of the pixel to be interpolated are pixels of low-resolution image or interpolated pixels. For example, when the neighboring pixels are the pixels of low-resolution image, it is judged that the pixel to be interpolated should be interpolated by INTRA interpolation, and when the neighboring pixels are interpolated pixels, it is judged that the pixel to be interpolated should be interpolated by MC interpolation.

Note that, in FIG. 11F, whether INTRA interpolation or MC interpolation should be applied is judged for each pixel to be interpolated. However, such a judgment made be made on a block basis or on a slice basis.

The variable length coding unit 125 may firstly input low-resolution image bit stream LVS from the variable length coding unit 113, and then output the bit stream in association with the additional information.

As has been described so far, with the image encoder and the image decoder according to this embodiment, it is possible to generate high-resolution images from low-resolution images with low amount of processing and high image quality.

Variation 1 of the First Embodiment

The following variation may be implemented within the practical range of the first embodiment.

The configuration of the additional information generation unit 102 may be such that the high-resolution image generation unit 121 is removed, and instead, a high-resolution image signal HV1 of the same time as the encoding time of a decoded high-resolution image signal is inputted in the motion vector estimation unit 122, as a searching target. In the motion estimation unit 122, a motion vector of the high-resolution image is estimated from the high-resolution image signal HV1 and a difference motion vector intended for high-resolution images is generated. In this way, it is possible to simplify the configuration of the encoder 1, and realize low amount of processing.

The configuration of the additional information generation unit 102 may also be such that the high-resolution image generation unit 121 is removed, and instead, a high-resolution image signal HV2 of the same time as the time of a decoded high-resolution image signal is inputted in the motion vector estimation unit 122, as a searching target. In the motion estimation unit 122, a motion vector of the high-resolution image is estimated from the high-resolution image signals HV1 and HV2, and a difference motion vector intended for high-resolution images is generated.

Note that, instead of removing the high-resolution image generation unit 121, the high-resolution image generation unit 121 may be used only for the generation mode selection. In this way, it is possible to realize high image quality while reducing the amount of processing required for improving the resolution of a decoded image prior to the current image by one frame.

Second Embodiment

Figure 12:
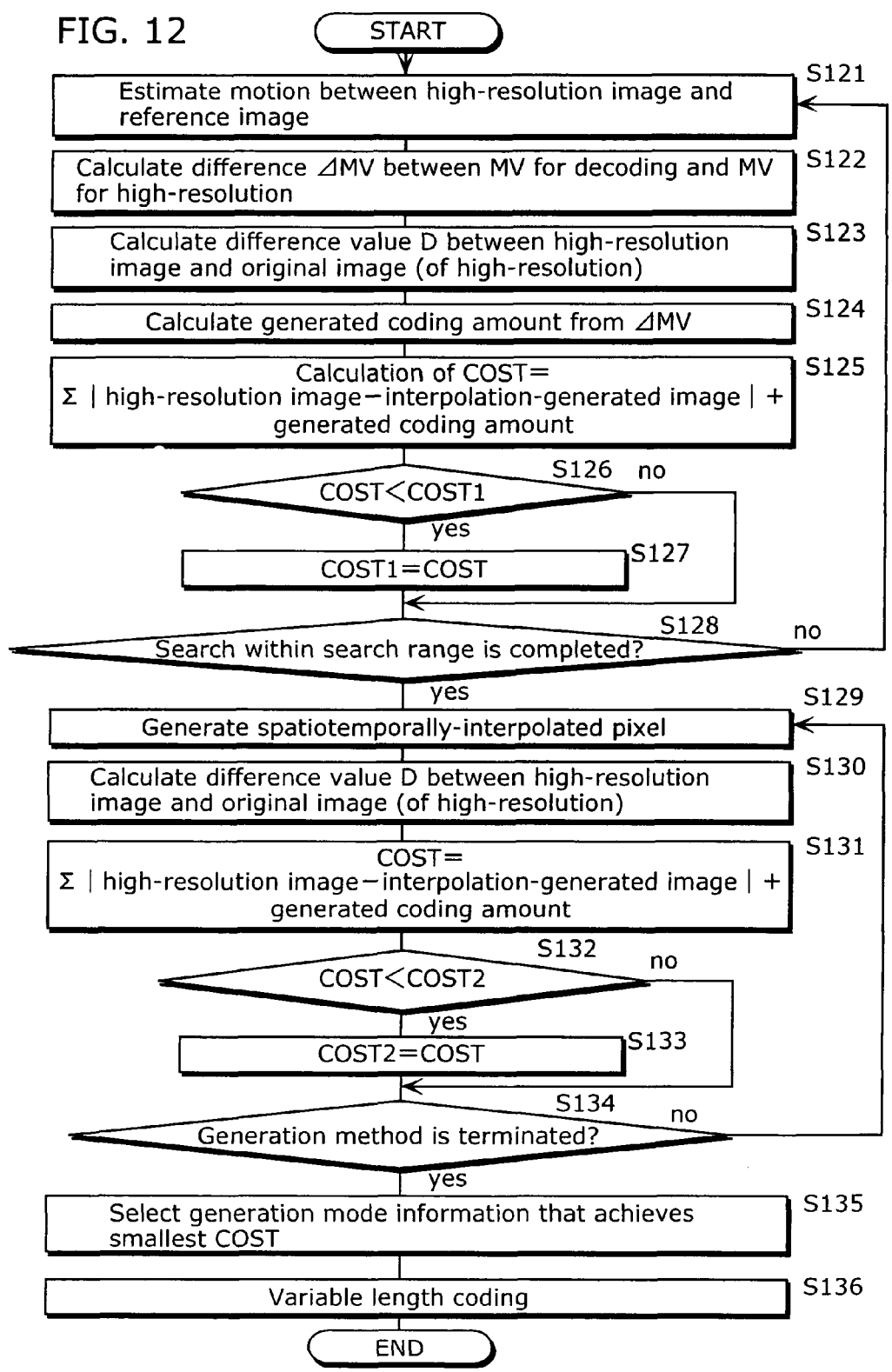
FIG. 12 is a flowchart showing another example of image coding processing.

FIG. 12 is a flowchart showing another example of the image coding processing according to the second embodiment. The processing shown in the flowchart is performed instead of the processing shown in FIG. 7 and FIG. 8 of the first embodiment.

In FIG. 12, the motion vector estimation unit 122 estimates, based on an original image (high-resolution image HV1), a motion vector with reference to an image whose resolution has already been improved and which is in the high-resolution image generation unit 121 (S121), and calculates a difference motion vector between the estimated motion vector and the motion vector estimated by the motion vector estimation unit 118 (S122). The generation mode selection unit 124 calculates (S123) a difference value D between the original image (high-resolution image HV1) and the high-resolution image generated by the high-resolution image generation unit 121 based on the difference motion vector, calculates the generated coding amount in the case where the difference motion vector is coded as additional information (S124), and then calculates COST as shown in the following expression (S125).

$$COST = \Sigma | \text{high-resolution image} - \text{interpolation-generated image} | + \text{generated coding amount}$$

Σ|high-resolution image−interpolation-generated image| in the expression is a sum of the difference values D calculated in S123 and signifies a sum of pixel value differences, each of which is obtained per block between the original image and the high-resolution image generated based on a difference motion vector. When the value indicates "0", it means that the interpolation-generated image matches the original image (i.e. the quality of the interpolation-generated image is the best). In contrast, the greater the value is, the greater the difference between the interpolation-generated image and the original image is (this means that the accuracy of resolution improvement is low and the quality of the inter-polation-generated image is degraded). The generated coding amount is calculated in S124. When the generated coding amount is small, it means that the coding efficiency of the low-resolution image bit stream LVS is not degraded so much, and when the generated coding amount is large, it means that the coding efficiency of the low-resolution image bit stream LVS is deteriorated. When the value of COST mentioned above is large, it means that at least one of the image quality and the coding efficiency of the high-resolution image is degraded. In contrast, the smaller the value of COST is, the higher both the image quality and the coding efficiency of the high-resolution image are.

Moreover, the generation mode selection unit 124 compares the calculated COST with COST1 (S126), and updates the value of COST1 to the value of COST in the case where the value of COST is smaller than the value of COST1 (S127).

Here, the initial value of COST1 is a threshold of COST which should be retained at the very least, and COST1 is gradually updated to the smallest COST in the loop processing until the search of a motion vector within a search range is completed (S128). Note that, in S128, the generation mode selection unit 124 judges whether or not the search range has already been searched through, but may judge whether or not several generation modes are attempted out of the generation modes (the second to fourth modes) that are similar to the coding modes.

Thus, the generation mode selection unit 124 can obtain a motion vector or a generation mode that achieves the smallest COST1 with regard to a high-resolution image generated based on a difference motion vector.

Also, the spatiotemporally-interpolated image generation unit 123 generates an interpolated image based on spatiotemporal interpolation (S129), and the generation mode selection unit 124 calculates the difference value D between the generated interpolated-image and the original image (high-resolution image HV1) (S130), and then calculates COST (S131). In addition, the generation mode selection unit 124 compares the calculated COST with COST2 (S132), and updates the value of COST2 to the value of COST in the case where the value of COST is smaller than the value of COST2 (S133). Here, the initial value of COST2 is a threshold of COST which should be retained at the very least, and it may be the same value as the initial value of COST1. COST2 is gradually updated to the smallest value of COST in the loop processing until the generation method based on interpolation using motion vectors is terminated (S134). Note that, in S134, the generation mode selection unit 124 judges whether or not the generation method based on interpolation is terminated, but this judgment may be made as to whether the attempt of the generation modes is finished, while changing the types or toughness of filters used for the interpolation. The types or toughness of filters used for the interpolation may be selected according to down sampling information DSI.

Thus, the generation mode selection unit 124 can obtain a generation mode that achieves the smallest COST2 with regard to the high-resolution image generated by spatiotemporal interpolation.

Next, the generation mode selection unit 124 selects a generation mode corresponding to the smaller one of COST1 and COST2 (S135). The variable length coding unit 125 codes generation mode information indicating the selected generation mode (S136).

In this way, COST serves as a standard for evaluating the degradation in the quality of high-resolution images and the deterioration in coding efficiency of low-resolution images caused by the addition of the additional information. The generation mode selection unit 124 according to this embodiment calculates COST in various generation modes, and is configured to select a generation mode that achieves the smallest COST. As a result, it is possible to improve the quality of the high-resolution images and minimize the deterioration in coding efficiency due to the addition of the additional information.

Third Embodiment

Furthermore, storing, into a recording medium such as a flexible disc, coding and decoding programs or a coded stream (data stream) for realizing the configuration of the coding and decoding processing shown in each of the above-mentioned embodiments enables easy implementation in an independent computer system of the processing shown in each of the above-mentioned embodiments.

Figure 13A:
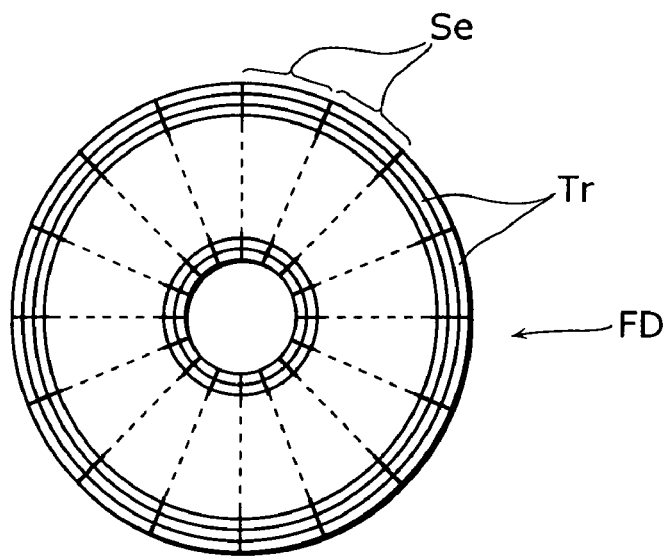
FIG. 13A shows an example of a physical format of a flexible disc which is a main body of a storage media.
Figure 13B:
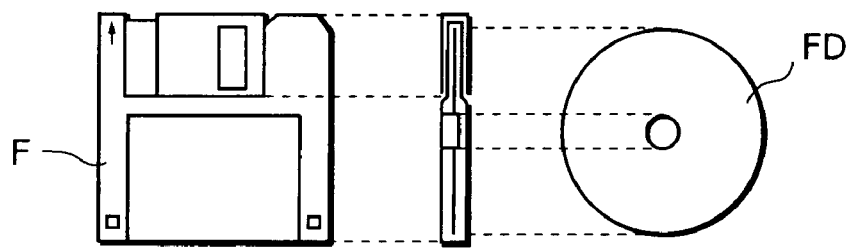
FIG. 13B shows a full appearance of the flexible disc, a structure at cross section and the flexible disc itself.
Figure 13C:
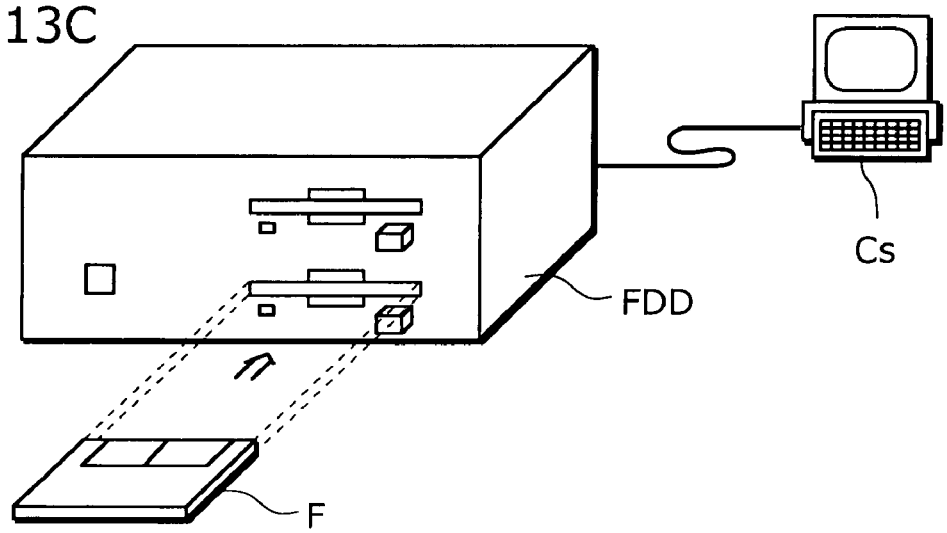
FIG. 13C shows a configuration for recording and reproduction of the program in the flexible disc FD.

FIGS. 13A to 13C are schematic diagrams for showing the case where the coding or decoding processing in the above mentioned first and second embodiments are executed in a computer system using a flexible disc storing the coding program and the decoding program.

FIG. 13B shows a full appearance of the flexible disc, a structure at cross section and the flexible disc itself, whereas FIG. 13A shows an example of a physical format of a flexible disc which is a main body of a storage media. A flexible disc FD is contained in a case F, a plurality of tracks Tr are formed concentrically on the surface of the disc from the periphery into the inner radius of the disc, and each track is divided into 16 sectors Se in the angular direction. Therefore, in the case of the flexible disc storing the above-mentioned program, data as the program is recorded in an area allocated for it on the flexible disc FD.

FIG. 13C shows a configuration for recording and reproducing the program on the flexible disc FD. In the case of recording the program on the flexible disc FD, the computer system Cs writes data as the program in a computer system Cs via a flexible disc drive. In the case of constructing the encoding method and the decoding method mentioned above in the computer system by the program in the flexible disc, the program is read out from the flexible disc through the flexible disc drive, and then transferred to the computer system.

The above description is provided on an assumption that a storing medium is a flexible disc, but the same processing can also be performed using an optical disc. In addition, the storing medium is not limited to a flexible disc and an optical disk, and any other medium such as an IC card and a ROM cassette can be used provided that a program can be recorded.

The encoding method and the decoding method described in the above-mentioned embodiments can be implemented in a form of a semiconductor such as an LSI, in a mobile communication apparatus such as a cell phone, a car navigation system or an image shooting device such as a digital video camera, a digital steel camera. Also, the coding and the decoding methods can be implemented by three types of terminals: a sending/receiving terminal equipped with both an encoder and a decoder, a sending terminal equipped with an encoder only, and a receiving terminal equipped with a decoder only. The concrete application examples will be described using FIGS. 14 to 17.

Figure 14:
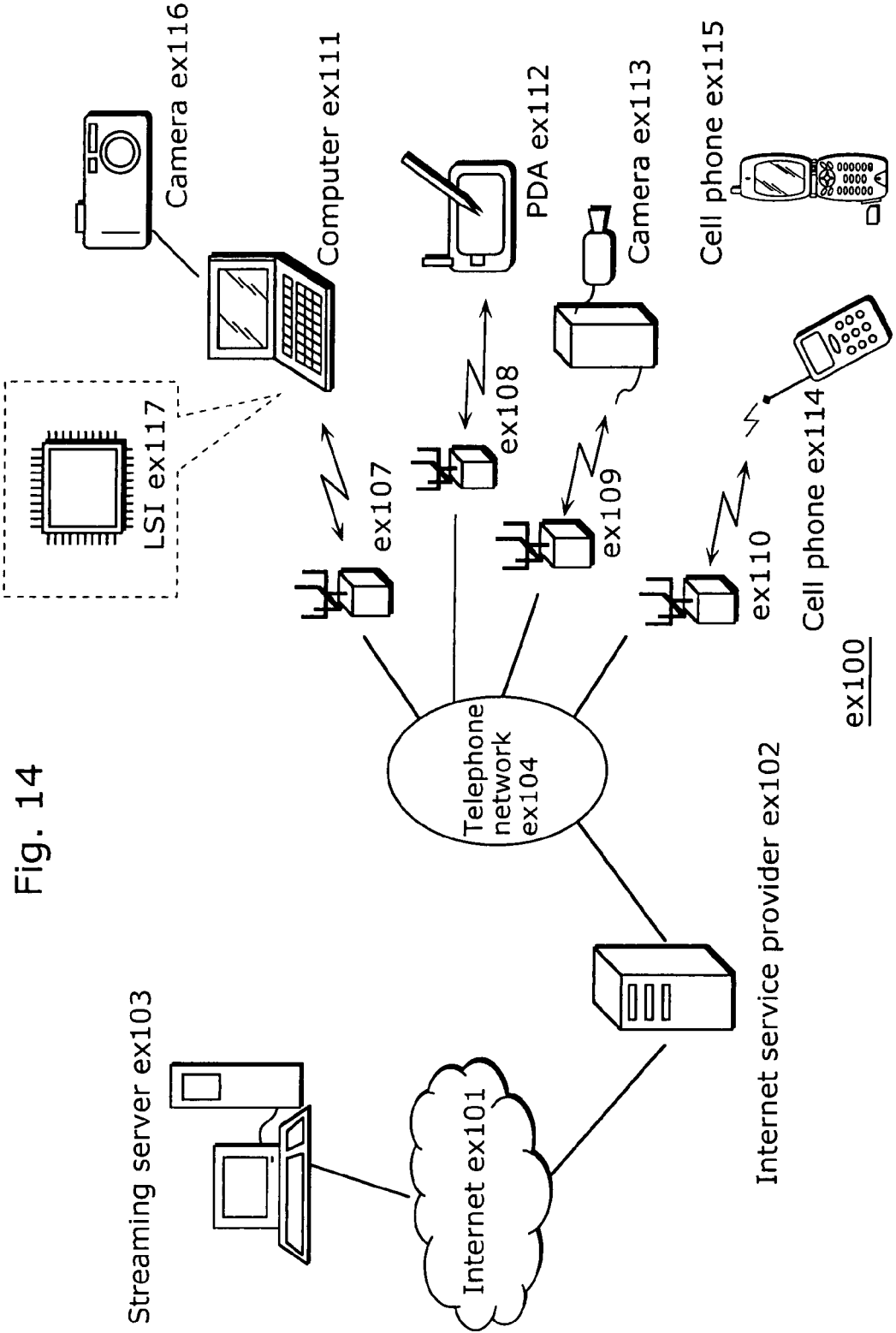
FIG. 14 is a block diagram showing an overall configuration of a content provision system for realizing content distribution services.

FIG. 14 is a block diagram showing an overall configuration of a content provision system ex100 for realizing content distribution services. The area for providing communication service is divided into cells of desired size, and cell sites ex107~ex110 which are fixed wireless stations placed in respective cells.

This content supply system ex101 is connected to devices such as a computer ex111, a PDA (Personal Digital Assistant) ex112, a camera ex113, a cell phone ex114 and a cell phone with a camera ex115 via the Internet ex101, an Internet service provider ex102, a telephone network ex104 and cell sites ex107~ex110.

However, the content supply system ex100 is not limited to the configuration as shown in FIG. 27 and may be connected to a combination of any of them. Also, each device may be connected directly to the telephone network ex104 not through the cell sites ex107~ex110.

The camera ex113 is a device capable of shooting video such as a digital video camera. The cell phone may be a cell phone of a PDC (Personal Digital Communications) system, a CDMA (Code Division Multiple Access) system, a W-CDMA (Wideband-Code Division Multiple Access) system or a GSM (Global System for Mobile Communications) system, a PHS (Personal Handyphone System) or the like.

A streaming server ex103 is connected to the camera ex113 via the telephone network ex104 and the cell site ex109, which realizes a live distribution or the like using the camera ex113 based on the coded data transmitted from the user. Either the camera ex113 or the server which transmits the data may code the data. Also, the video data shot by a camera ex116 may be transmitted to the streaming server ex103 via the computer ex111. In this case, either the camera ex116 or the computer ex111 may code the video data. An LSI ex117 included in the computer ex111 or the camera ex116 actually performs coding processing. Software for coding and decoding pictures may be integrated into any type of storage medium (such as a CD-ROM, a flexible disc and a hard disk) that is a recording medium which is readable by the computer ex111 or the like. Furthermore, a cell phone with a camera ex115 may transmit the video data. The video data here is the data coded by the LSI included in the cell phone ex115.

The content supply system ex100 codes contents (such as a music live video) shot by users using the camera ex113, the camera ex116 or the like in the same way as shown in the above-mentioned embodiments and transmits them to the streaming server ex103, while the streaming server ex103 makes stream distribution of the content data to the clients at their requests. The clients include the computer ex111, the PDA ex112, the camera ex113, the cell phone ex114 and so on capable of decoding the above-mentioned coded data. In the content supply system ex100, the clients can thus receive and reproduce the coded data, and can further receive, decode and reproduce the data in real time so as to realize personal broadcasting.

The encoder or the decoder as described in the above-mentioned embodiments can be used for coding and decoding performed by each of the devices configuring this system.

A cell phone will be used as an example of such a device.

Figure 15:
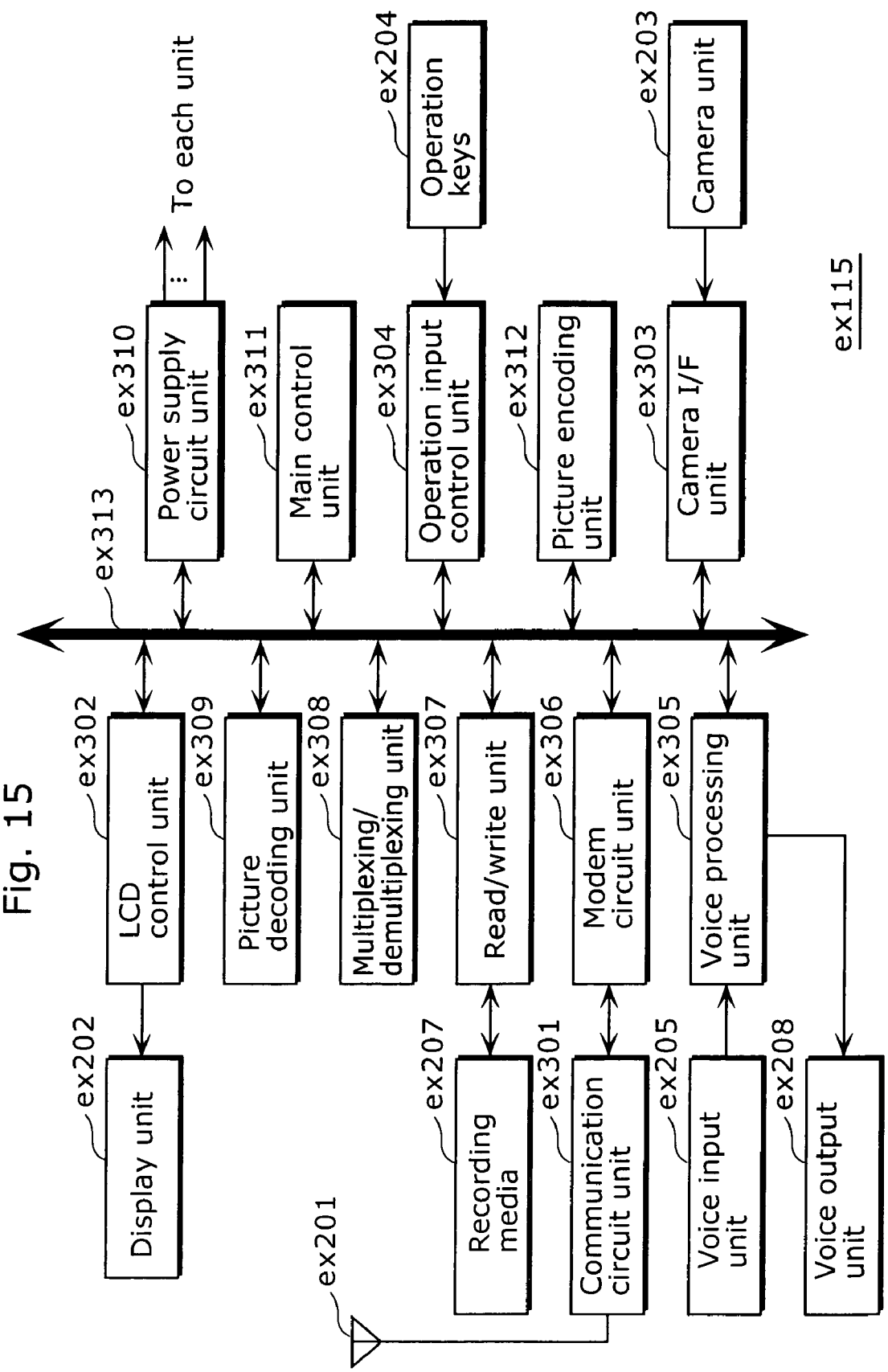
FIG. 15 is a diagram showing a cell phone ex115 using an image encoding method and an image decoding method.

FIG. 15 is a diagram showing the cell phone ex115 using the picture encoding method and the picture decoding method described in the above-mentioned embodiments. The cell phone ex115 has an antenna ex201 for communicating with the cell site ex110 via radio waves, a camera unit ex203 such as a CCD camera capable of shooting moving and still pictures, a display unit ex202 such as a liquid crystal display for displaying the data such as decoded pictures and the like shot by the camera unit ex203 and received by the antenna ex201, a body unit including a set of operation keys ex204, a voice output unit ex208 such as a speaker for outputting voices, a voice input unit 205 such as a microphone for inputting voices, a storage medium ex207 for storing coded or decoded data such as data of moving or still pictures shot by the camera, data of received e-mails and data of moving or still pictures, and a slot unit ex206 for attaching the storage medium ex207 to the cell phone ex115. The storage medium ex207 stores in itself a flash memory element, a kind of EEPROM (Electrically Erasable and Programmable Read Only Memory) that is a nonvolatile memory electrically erasable from and rewritable to a plastic case such as a SD card.

Figure 16:
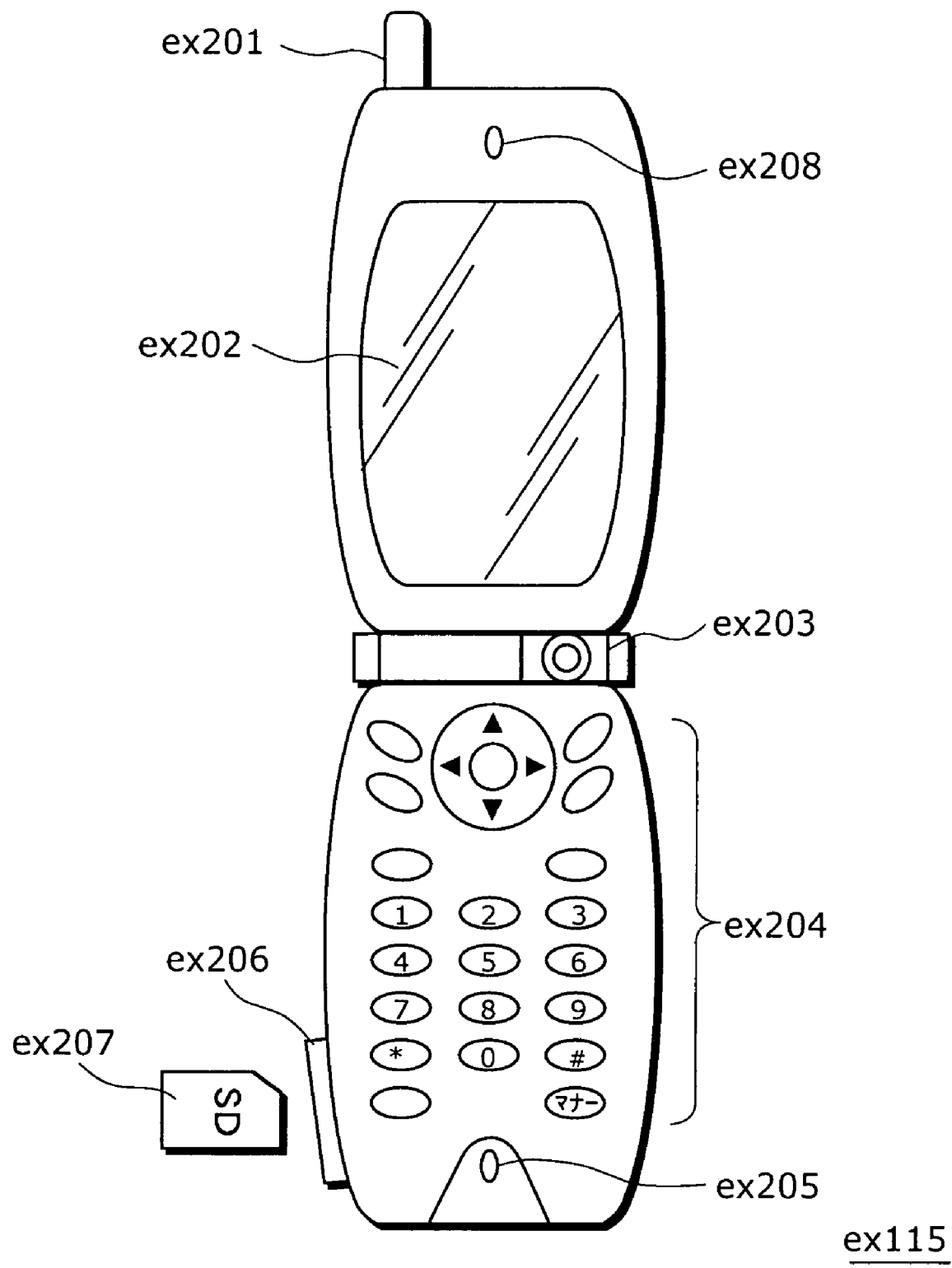
FIG. 16 is a sketch showing an appearance of the cell phone.

Moreover, the cell phone ex115 will be described with reference to FIG. 16. In the cell phone ex115, a main control unit ex311, designed in order to control each unit of the main body configured of the display unit ex202 as well as the operation keys ex204, is connected mutually to a power supply circuit unit ex310, an operation input control unit ex304, a picture coding unit ex312, a camera interface unit ex303, an LCD (Liquid Crystal Display) control unit ex302, a picture decoding unit ex309, a demultiplexing unit ex308, a read/write unit ex307, a modem circuit unit ex306 and a voice processing unit ex305 via a synchronous bus ex313.

When a call-end key or a power key is turned ON by a user's operation, the power supply circuit unit ex310 supplies the respective units with power from a battery pack so as to activate the camera attached digital cell phone ex115 to be operable.

In the cell phone ex115, the voice processing unit ex305 converts the voice signals received by the voice input unit ex205 in conversation mode into digital voice data under the control of the main control unit ex311 including a CPU, ROM and RAM, the modem circuit unit ex306 performs spread spectrum processing of the digital voice data, and the communication circuit unit ex301 performs digital-to-analog conversion and frequency transform of the data, so as to transmit it via the antenna ex201. Also, in the cell phone ex115, the communication circuit unit ex301 amplifies the data received by the antenna ex201 in conversation mode and performs frequency transform and analog-to-digital conversion to the data, the modem circuit unit ex306 performs inverse spread spectrum processing of the data, and the voice processing unit ex305 converts it into analog voice data, so as to output it via the voice output unit 208.

Furthermore, in the case of sending an e-mail in data communication mode, the text data of the e-mail inputted by operating the operation keys ex204 of the main body is sent out to the main control unit ex311 via the operation input control unit ex304. In the main control unit ex311, after the modem circuit unit ex306 performs spread spectrum processing of the text data and the communication circuit unit ex301 performs digital-to-analog conversion and frequency transform to it, the data is transmitted to the cell site ex110 via the antenna ex201.

In the case of transmitting picture data in data communication mode, the picture data shot by the camera unit ex203 is supplied to the picture coding unit ex312 via the camera interface unit ex303. In the case of not transmitting the picture data, it is also possible to display the picture data shot by the camera unit ex203 directly on the display unit 202 via the camera interface unit ex303 and the LCD control unit ex302.

The picture coding unit ex312, which includes the picture encoder as explained in the present invention, compresses and codes the picture data supplied from the camera unit ex203 by the encoding method used for the picture encoder as shown in the above-mentioned first embodiment so as to transform it into coded picture data, and sends it out to the demultiplexing unit ex308. At this time, the cell phone ex115 sends out the voices received by the voice input unit ex205 during the shooting with the camera unit ex203 to the demultiplexing unit ex308 as digital voice data via the voice processing unit ex305.

The demultiplexing unit ex308 multiplexes the coded picture data supplied from the picture coding unit ex312 and the voice data supplied from the voice processing unit ex305 by a predetermined method, the modem circuit unit ex306 performs spread spectrum processing of the multiplexed data obtained as a result of the multiplexing, and the communication circuit unit ex301 performs digital-to-analog conversion and frequency transform of the data for the transmission via the antenna ex201.

As for receiving data of a video file which is linked to a Web page or the like in data communication mode, the modem circuit unit ex306 performs inverse spread spectrum processing of the data received from the cell site ex110 via the antenna ex201, and sends out the multiplexed data obtained as a result of the processing to the demultiplexing unit ex308.

In order to decode the multiplexed data received via the antenna ex201, the demultiplexing unit ex308 separates the multiplexed data into a bit stream of picture data and a bit stream of voice data, and supplies the coded picture data to the picture decoding unit ex309 and the voice data to the voice processing unit ex305 respectively via the synchronous bus ex313.

Next, the picture decoding unit ex309, which includes the picture decoder as explained in the above-mentioned invention, decodes the bit stream of picture data by the decoding method corresponding to the encoding method as shown in the above-mentioned embodiments to generate reproduced video data, and supplies this data to the display unit ex202 via the LCD control unit ex302, and thus picture data included in a video file linked to a Web page, for instance, is displayed. At the same time, the voice processing unit ex305 converts the voice data into analog voice data, and supplies this data to the voice output unit ex208, and thus voice data included in the video file linked to a Web page, for instance, is reproduced.

Figure 17:
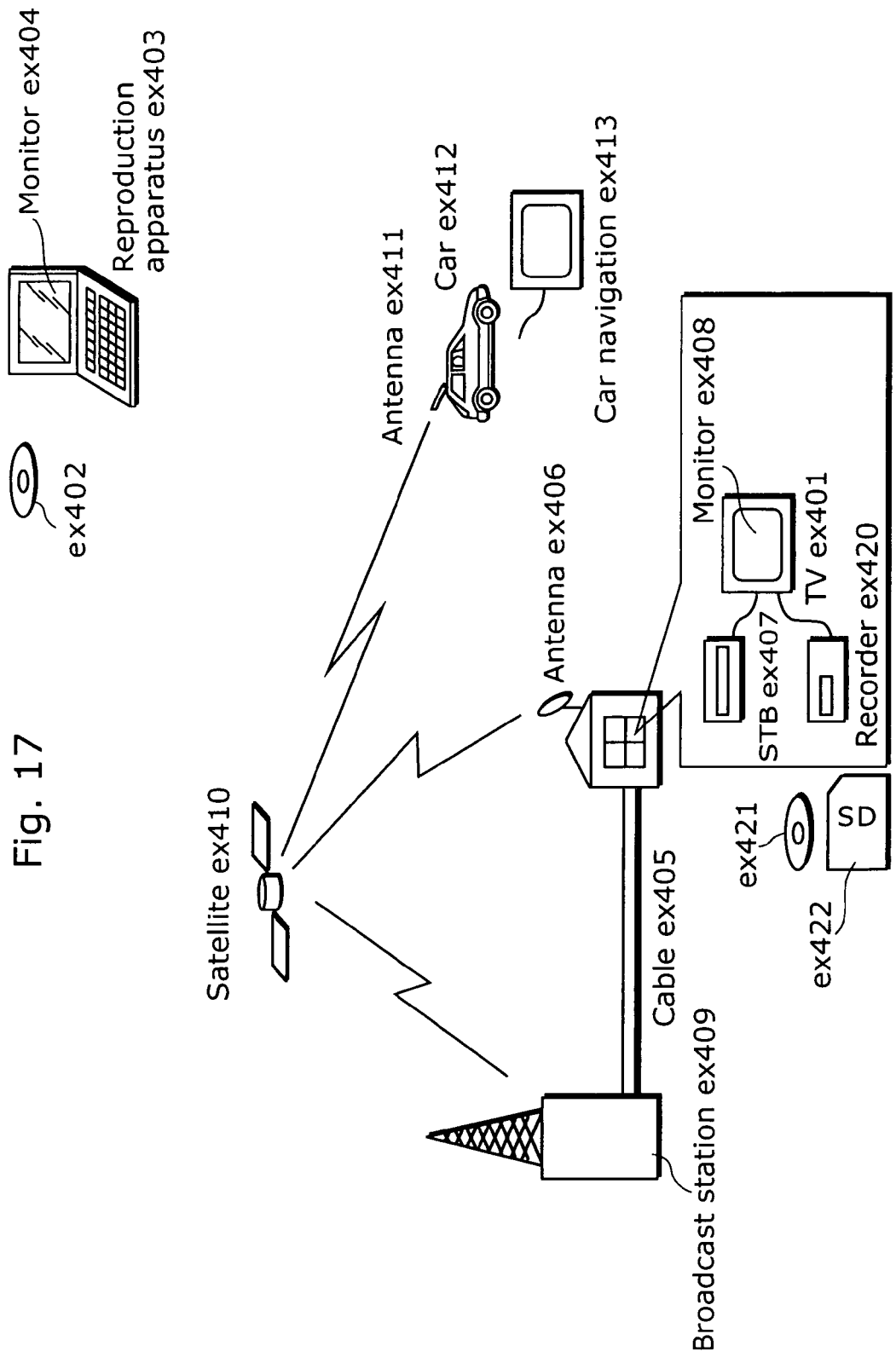
FIG. 17 is a diagram showing a configuration of a digital broadcasting system.

The present invention is not limited to the above-mentioned system, and either the picture encoder or the picture decoder in the above-mentioned embodiments can be incorporated into a digital broadcasting system as shown in FIG. 17. Such ground-based or satellite digital broadcasting has been in the news lately. More specifically, a bit stream of video information is transmitted from a broadcast station ex409 to or communicated with a broadcast satellite ex410 via radio waves. Upon receipt of it, the broadcast satellite ex410 transmits radio waves for broadcasting. Then, a home-use antenna ex406 with a satellite broadcast reception function receives the radio waves, and a television (receiver) ex401 or a set top box (STB) ex407 decodes the bit stream for reproduction. The picture decoder as shown in the above-mentioned embodiment can be implemented in the reproducing device ex403 for reading out and decoding the bit stream recorded on a storage medium ex402 that is a recording medium such as a CD and a DVD. In this case, the reproduced video signals are displayed on a monitor ex404. It is also conceivable to implement the picture decoder in the set top box ex407 connected to a cable ex405 for a cable television or the antenna ex406 for satellite and/or ground-based broadcasting so as to reproduce them on a monitor ex408 of the television ex401. The picture decoder may be incorporated into the television, not in the set top box. Also, a car ex412 having an antenna ex411 can receive signals from the satellite ex410 or the cell site ex107 for reproducing video on a display device such as a car navigation system ex413.

Furthermore, the picture encoder as shown in the above-mentioned embodiments can code picture signals for recording on a recording medium. As a concrete example, there is a recorder ex420 such as a DVD recorder for recording picture signals on a DVD disk ex421 and a disk recorder for recording them on a hard disk. They can be recorded on an SD card ex422. If the recorder ex420 includes the picture decoder as shown in the above-mentioned embodiments, the picture signals recorded on the DVD disk ex421 or the SD card ex422 can be reproduced for display on the monitor ex408.

As for the configuration of the car navigation system ex413, the configuration without the camera unit ex203, the camera interface unit ex303 and the picture coding unit ex312, out of the components shown in FIG. 15, is conceivable. The same applies to the computer ex111, the television (receiver) ex401 and others.

In addition, three types of implementations are conceivable for a terminal such as the above-mentioned cell phone ex114; a sending/receiving terminal equipped with both an encoder and a decoder, a sending terminal equipped with an encoder only, and a receiving terminal equipped with a decoder only.

Note that each of the function blocks in the block diagrams shown in FIG. 1 and FIG. 2 are typically realized as an LSI that is an integrated circuit device. The LSI may be integrated in a single chip or in several chips (for example, the function blocks other than a memory may be implemented in a single chip). Depending on the level of integration, an LSI may be called an IC, a system LSI, a super LSI or an ultra LSI.

The method of integration is not limited to such LSI, and can be realized by a private circuit or a general processor. Instead, a Field Programmable Gate Array (FPGA) that can store programs after the manufacturing of LSI, or a configurable processor that can reconfigure connection and setting of a circuit cell included in an LSI may be used instead.

With the arrival of new technology for the integration of components into a chip, which replaces LSI due to the progress in semiconductor technique or to another technique deriving from it, the function blocks can be surely integrated using such new technology. The application of biotechnology is one of such possibilities.

Also, among the function blocks, the units to store data may be configured separately, like the storage medium 115 of the embodiment, without being integrated into a chip.

Note that the main part of the function blocks shown in the block diagrams FIGS. 1 and 2 as well as the main part of the flowcharts shown in FIGS. 7, 8, 10 to 12 may also be realized by a processor or a program.

In this way, it is possible to use the image encoding method or the image decoding method shown in the above-mentioned embodiments for any of the above-mentioned apparatuses or systems. Thus, the effects described in the above-mentioned embodiments can be obtained.

The present invention shall not be limited to the above-mentioned embodiments, and various modifications or corrections are possible within the scope of the present invention.

INDUSTRIAL APPLICABILITY

The present invention is suitable for an encoder and a decoder that encode or decode images, and also suitable for a web server which distributes videos, a network terminal

The invention claimed is:

1. A decoder, comprising:
a processor;
an obtainment unit operable to obtain additional information and stream data, wherein (i) the additional information includes a motion vector which indicates a motion of an image of first video data, and (ii) the stream data is coded data of second video data which has the same content as the first video data and which has a resolution lower than a resolution of the first video data;
a decoding unit operable to decode, using the processor, the stream data into an image of the second video data; and
a conversion unit operable to convert the image of the second video data into an image of third video data by interpolating the image of the second video data using the additional information, wherein (i) the image of the second video data is obtained by the decoding performed by said decoding unit, and (ii) the third video data has the same resolution as the resolution of the first video data,
wherein said conversion unit includes:
an extraction unit operable to extract the motion vector from the additional information;
a first interpolation unit operable to interpolate pixels in the image of the second video data not using the motion vector but using pixels at predetermined positions in the image of the second video data, the image of the second video data being obtained by the decoding performed by said decoding unit;
a second interpolation unit operable to interpolate pixels in a picture using pixels at positions in another picture, each of the picture and the other picture being the image of the second video data obtained by the decoding performed by said decoding unit, and each of the positions being indicated by the extracted motion vector; and
a generation unit operable to generate the image of the third video data by selectively using said first interpolation unit and said second interpolation unit.

2. The decoder according to claim 1,
wherein said second interpolation unit includes:
a memory unit operable to hold a converted image of the third video data and an image to be converted of the third video data;
a first specification unit operable to specify a position of each pixel to be interpolated in the image to be converted of the third video data;
a second identification unit operable to identify a pixel in the converted image of the third video data according to the extracted motion vector, the pixel being located in the position specified by said first specification unit;
a reading unit operable to read a value of the pixel identified by said second identification unit; and
a writing unit operable to write a value of an interpolated pixel in the position specified by said first specification unit, according to the value read by said reading unit.

3. The decoder according to claim 2,
wherein the additional information includes a motion vector per block which constitutes the first video data,
wherein said first specification unit is operable to specify the position of the pixel to be interpolated in a block, and wherein said second identification unit is operable to identify a pixel located in the position specified by said first specification unit, according to the motion vector per block.

4. The decoder according to claim 2,
wherein the additional information includes two motion vectors for each block which constitutes the first video data,
wherein said second identification unit is operable to identify, in two converted images of the third video data, two pixels according to the two motion vectors, the two pixels being located in the positions specified by said first specification unit,
wherein said reading unit is operable to read values of the two pixels identified by said second identification unit, and
wherein said writing unit is operable to calculate a value of an interpolated pixel based on the values of the two pixels read by said reading unit.

5. The decoder according to claim 2,
wherein said generation unit is operable to:
generate the image of the third video data by interpolating the image of the second video data using said first interpolation unit in the case where the image of the second video data is intra-coded, and
generate the image of the third video data by interpolating the image of the second video data using said second interpolation unit in the case where the image of the second video data is inter-frame prediction coded.

6. A decoding method, comprising:
obtaining additional information and stream data, wherein (i) the additional information includes a motion vector which indicates a motion of an image of first video data, and (ii) the stream data is coded data of second video data which has the same content as the first video data and which has a resolution lower than a resolution of the first video data;
decoding the stream data into an image of the second video data; and
converting the image of the second video data into an image of third video data by interpolating the image of the second video data using the additional information, wherein (i) the image of the second video data is obtained by said decoding, and (ii) the third video data has the same resolution as the resolution of the first video data,
wherein, in said converting, (i) the motion vector is extracted from the additional information and (ii) the third video data is generated by selectively using a first interpolation method and a second interpolation method,
wherein, in the first interpolation method, pixels in the image of the second video data are interpolated not using the motion vector but using pixels at predetermined positions in the image of the second video data, the image of the second video data being obtained by said decoding, and
wherein, in the second interpolation method, pixels in a picture are interpolated using pixels at positions in another picture, each of the picture and the other picture being the image obtained by said decoding, and each of the positions being indicating by the extracted motion vector.

7. The decoding method according to claim 6,
wherein, in the interpolation using the second interpolation method, (i) a position of a pixel to be interpolated in an image to be converted of third video data is specified with reference to a memory which holds a converted image of the third video data and the image to be converted of the third video data,
(ii) a pixel located in the specified position is identified in the converted image of the third video data according to the extracted motion vector,
(iii) a value of the specified pixel is read, and
(iv) a value of an interpolated pixel is written in the specified position according to the read-out pixel value.

8. The decoding method according to claim 7,
wherein the additional information includes a motion vector per each block that constitutes the first video data,
wherein the position of the pixel is specified for each block, and
wherein a pixel located in the specified position is identified according to the motion vector per each block.

9. The decoding method according to claim 7,
wherein the additional information includes two motion vectors per each block that constitutes the first video data,
wherein the position of the pixel is specified for each block,
wherein two pixels are identified according to the two motion vectors, the two pixels being located in the specified positions, and
wherein a value of an interpolated pixel is calculated based on values of the two pixels.

10. The decoding method according to claim 7,
wherein in the selection of the first interpolation method and the second interpolation method,
(i) in the case where the image of the second video data is intra-coded, the first interpolation method is selected, and
(ii) in the case where the image of the second video data is inter-frame prediction coded, the second interpolation method is selected.

11. An image encoder, comprising:
a processor;
a conversion unit operable to convert first video data into second video data having a resolution lower than a resolution of the first video data;
a coding unit operable to code, using the processor, the second video data into stream data;
a generation unit operable to generate additional information which includes a motion vector of the first video data and is used for interpolating pixels in an image of the second video data; and
an output unit operable to output the stream data and the additional information without outputting codes which indicate pixel values of the first video data,
wherein said generation unit is further operable to generate mode information for converting the second video data into third video data having the same resolution as the resolution of the first video data, and include the generated mode information in the additional information,
wherein the mode information indicates one of a first mode and a second mode,
wherein in the first mode, pixels in the image of the second video data obtained by decoding are interpolated not using the motion vector but using pixels at predetermined positions in the image of the second video data obtained by decoding, and
wherein in the second mode, pixels in a picture are interpolated using pixels at positions in another picture, each of the picture and the other picture being the image of the second video data obtained by decoding, and each of the positions being indicated by the motion vector.

12. An encoding method, comprising:
converting first video data into second video data having a resolution lower than a resolution of the first video data;
coding the second video data into stream data;
generating additional information which includes a motion vector of the first video data and is used for interpolating pixels in an image of the second video data;
outputting the stream data and the additional information without outputting codes which indicate pixel values of the first video data,
wherein in said generating, mode information for converting the second video data into third video data having the same resolution as the resolution of the first video data is further generated, and the generated mode information is included in the additional information,
wherein the mode information indicates one of a first mode and a second mode,
wherein in the first mode, pixels in the image of the second video data obtained by decoding are interpolated not using the motion vector but using pixels at predetermined positions in the image of the second video data obtained by decoding, and
wherein in the second mode, pixels in a picture are interpolated using pixels at positions in another picture, each of the picture and the other picture being the image of the second video data obtained by decoding, and each of the positions being indicated by the motion vector.

13. A non-transitory computer readable recording medium having stored thereon a program that causes a computer to function as the following:
an obtainment unit operable to obtain additional information and stream data, wherein (i) the additional information includes a motion vector which indicates a motion of an image of first video data, and (ii) the stream data is coded data of second video data which has the same content as the first video data and which has a resolution lower than a resolution of the first video data;
a decoding unit operable to decode the stream data into an image of the second video data; and
a conversion unit operable to convert the image of the second video data into an image of third video data by interpolating the image of the second video data using the additional information, wherein (i) the image of the second video data is obtained by the decoding, and (ii) the third video data has the same resolution as the resolution of the first video data
wherein said conversion unit includes:
an extraction unit operable to extract the motion vector from the additional information;
a first interpolation unit operable to interpolate pixels in the image of the second video data not using the motion vector but using pixels at predetermined positions in the image of the second video data, the image of the second video data being obtained by the decoding performed by said decoding unit;
a second interpolation unit operable to interpolate pixels in a picture using pixels at positions in another picture, each of the picture and the other picture being the image of the second video data obtained by the decoding performed by said decoding unit, and each of the positions being indicated by the extracted motion vector; and
a generation unit operable to generate the image of the third video data by selectively using said first interpolation unit and said second interpolation unit.

14. A non-transitory computer readable recording medium having stored thereon a program that causes a computer to function as the following:

a conversion unit operable to convert first video data into second video data having a resolution lower than a resolution of the first video data;

a coding unit operable to code the second video data into stream data;

a generation unit operable to generate additional information which includes a motion vector of the first video data and is used for interpolating pixels in an image of the second video data; and an output unit operable to output the stream data and the additional information without outputting codes which indicate pixel values of the first video data, wherein said generation unit is further operable to generate mode information for converting the second video data into third video data having the same resolution as the resolution of the first video data, and include the generated mode information in the additional information, wherein the mode information indicates one of a first mode and a second mode, wherein in the first mode, pixels in the image of the second video data obtained by decoding are interpolated not using the motion vector but using pixels at predetermined positions in the image of the second video data obtained by decoding, and wherein in the second mode, pixels in a picture are interpolated using pixels at positions in another picture, each of the picture and the other picture being the image of the second video data obtained by decoding, and each of the positions being indicated by the motion vector.

15. A semiconductor device comprising:

a processor;

an obtainment unit operable to obtain additional information and stream data, wherein (i) the additional information includes a motion vector which indicates a motion of an image of first video data, and (ii) the stream data is coded data of second video data which has the same content as the first video data and which has a resolution lower than a resolution of the first video data;

a decoding unit operable to decode, using the processor, the stream data into an image of the second video data; and a conversion unit operable to convert the image of the second video data into an image of third video data by interpolating the image of the second video data using the additional information, wherein (i) the image of the second video data is obtained by the decoding, and (ii) the third video data has the same resolution as the resolution of the first video data wherein said conversion unit includes:

an extraction unit operable to extract the motion vector from the additional information;

a first interpolation unit operable to interpolate pixels in the image of the second video data not using the motion vector but using pixels at predetermined positions in the image of the second video data, the image of the second video data being obtained by the decoding performed by said decoding unit;

a second interpolation unit operable to interpolate pixels in a picture using pixels at positions in another picture, each of the picture and the other picture being the image of the second video data obtained by the decoding performed by said decoding unit, and each of the positions being indicated by the extracted motion vector; and a generation unit operable to generate the image of the third video data by selectively using said first interpolation unit and said second interpolation unit.

* * * * *

UNITED STATES PATENT AND TRADEMARK OFFICE
CERTIFICATE OF CORRECTION

PATENT NO. : 8,208,549 B2
APPLICATION NO. : 11/661277
DATED : June 26, 2012
INVENTOR(S) : Hisao Sasai Page 1 of 1

It is certified that error appears in the above-identified patent and that said Letters Patent is hereby corrected as shown below:

On the Title Page

In Item (30), Foreign Application Priority Data, please replace "04020569" with -- 04020569.2 --.

Signed and Sealed this
Thirtieth Day of October, 2012

David J. Kappos
*Director of the United States Patent and Trademark Office*